United States Patent
Cai et al.

(10) Patent No.: US 11,677,334 B2
(45) Date of Patent: Jun. 13, 2023

(54) MODULAR INTELLIGENT COMBINED WIND POWER CONVERTER AND CONTROL METHOD THEREOF

(71) Applicant: SHANGHAI JIAO TONG UNIVERSITY, Shanghai (CN)

(72) Inventors: Xu Cai, Shanghai (CN); Han Wang, Shanghai (CN); Jianwen Zhang, Shanghai (CN); Gang Shi, Shanghai (CN); Jing Lv, Shanghai (CN); Yunfeng Cao, Shanghai (CN); Haoshu Shao, Shanghai (CN); Yao Qin, Shanghai (CN); Wei Lv, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 17/630,136

(22) PCT Filed: Jan. 12, 2021

(86) PCT No.: PCT/CN2021/071150
§ 371 (c)(1),
(2) Date: Jan. 25, 2022

(87) PCT Pub. No.: WO2022/012006
PCT Pub. Date: Jan. 20, 2022

(65) Prior Publication Data
US 2022/0271685 A1    Aug. 25, 2022

(30) Foreign Application Priority Data
Jul. 15, 2020 (CN) .......................... 202010679119.1

(51) Int. Cl.
*H02M 5/458* (2006.01)
*H02M 1/12* (2006.01)
(Continued)

(52) U.S. Cl.
CPC .......... *H02M 7/53875* (2013.01); *H02J 3/01* (2013.01); *H02J 3/381* (2013.01); *H02J 7/06* (2013.01);
(Continued)

(58) Field of Classification Search
CPC .... H02M 7/53875; H02M 1/12; H02M 5/458; H02M 1/0048; H02M 7/5395; H02J 3/01;
(Continued)

(56) References Cited

U.S. PATENT DOCUMENTS

2007/0121353 A1* 5/2007 Zhang ..................... H02J 3/381
363/39

FOREIGN PATENT DOCUMENTS

CN       112039347 A    12/2020

OTHER PUBLICATIONS

International Search Report and Written Opinion issued in International Application No. PCT/CN2021/071150 ; dated Apr. 15, 2021, 19 pgs.

(Continued)

*Primary Examiner* — Toan T Vu
(74) *Attorney, Agent, or Firm* — Hauptman Ham, LLP

(57) ABSTRACT

The present invention discloses a modular intelligent combined wind power converter and a control method thereof. The modular intelligent combined wind power converter comprises separate bridge arm power units, wherein a plurality of the bridge arm power units are connected in parallel to form a high-capacity bridge arm power module, three bridge arm power modules form a three-phase full-controlled bridge power module, and the three-phase full-controlled bridge power module comprises an electric reactor, a capacitor, a fuse and a circuit breaker to form a basic converter module, and the basic converter module forms a high-capacity wind power converter through a modular intelligent combination method.

18 Claims, 6 Drawing Sheets

(51) Int. Cl.
   *H02J 3/38*      (2006.01)
   *H02J 3/01*      (2006.01)
   *H02J 7/06*      (2006.01)
   *H02M 7/5387*    (2007.01)

(52) U.S. Cl.
   CPC .............. *H02M 1/12* (2013.01); *H02M 5/458* (2013.01); *H02J 2300/28* (2020.01)

(58) Field of Classification Search
   CPC .......... H02J 3/381; H02J 7/06; H02J 2300/28; H02J 3/46; Y02E 10/76; Y02E 40/40
   See application file for complete search history.

(56) References Cited

OTHER PUBLICATIONS

First Office Action issued in corresponding Chinese Application No. 202010679119.1; dated Mar. 2, 2021; 14 pgs.
Second Office Action issued in corresponding Chinese Application No. 202010679119.1; dated Apr. 16, 2021; 8 pgs.
Lv, Jing; "Research on Key Technique of Multi-unit Parallel Converter in Wind Power Genearation System"; China Academic Journal Electronic Pulishing House; C042-316; Jul. 2021; 97 pgs.

\* cited by examiner

MODULAR INTELLIGENT COMBINED WIND POWER CONVERTER AND CONTROL METHOD THEREOF

RELATED APPLICATIONS

The present application is a U.S. National Phase of International Application Number PCT/CN2021/071150 filed Jan. 12, 2021 and claims priority to Chinese Application Number 202010679119.1 filed Jul. 15, 2020.

TECHNICAL FIELD

The present invention relates to the technical field of power electronic converters and wind power generation, and in particular relates to a modular intelligent combined wind power converter, and an active circulation control method, a grid-connected current harmonic optimization control method, a converter thermal stress balance control method, a parallel current-sharing control method, a converter stable control method, and a power grid impedance self-adaptive control method thereof.

BACKGROUND ART

In recent years, the modular design and intelligent expansion technology of the wind power converter has become one of the key problems which must be faced and urgently need to be solved for large-capacity development of the offshore wind power converter in the future. The offshore high-capacity wind power converter must solve the three-prevention problems of high temperature prevention, high humidity prevention, high corrosion prevention, and the like, and therefore higher requirements are placed on environmental adaptability of the wind power converter. In addition, the marine traffic conditions are inconvenient, the transportation cost is high, and the wind power converter faces the problems of inconvenient maintenance, high cost and the like, thus the requirement on the reliability of the wind power converter is high; moreover, the offshore wind power is in a high-speed development stage at present, the capacity increasing speed of the wind power converter is remarkable, and the existing offshore wind power converters develop special wind power converters for different levels of capacity, resulting in a wide variety of similar components for wind power converters, which not only causes difficulties in production, maintenance and management, but also is not conducive to the rapid expansion of wind power converters. To solve the problems, a wind power converter basic power module is developed by adopting a modular design thought, the rapid increase of the capacity of the converter is achieved by utilizing the modular intelligent combination technology, then a large-scale high-capacity wind power converter is achieved by utilizing a single-variety element component, and the high-reliability and low-cost rapid development of the offshore wind power converter is achieved to meet application needs of future offshore wind power on the multi-specification high-capacity wind power converter are met. The modular intelligent combined wind power converter is a key facility for the future offshore wind turbine generator, and is of great significance for promoting high-speed development and reliable and stable utilization of the offshore wind power.

SUMMARY

An objective of the present section is to summarize some aspects of embodiments of the present invention and to briefly introduce some preferred embodiments. Some simplifications or omissions may be made in the present section, as well as in the abstract of description and title of invention of the present application to avoid obscuring the objects of this section, abstract of description and title of invention, and are not intended to limit the scope of the present invention.

In consideration of the above problems, the present invention is provided.

Thus, a technical problem solved by the present invention is to provide a modular intelligent combined wind power converter.

To solve the technical problems, the following technical solutions are provided: a modular intelligent combined wind power converter comprises separate bridge arm power units, wherein a plurality of the bridge arm power units are connected in parallel to form a high-capacity bridge arm power module, three bridge arm power modules form a three-phase full-controlled bridge power module, the three-phase full-controlled bridge power module comprises an electric reactor, a capacitor, a fuse, and a circuit breaker to form a basic converter module, and the basic converter module forms a high-capacity wind power converter through a modular intelligent combination method.

As a preferred embodiment of the modular intelligent combined wind power converter provided by the present disclosure, wherein the wind power converter can control accurate turn-on and turn-off of a bridge arm power switch through an intelligent driving unit of a separate power device, and a current-sharing controller is integrated in the bridge arm power module for achieving current sharing of each bridge arm in the bridge arm power module; a driving controller is integrated in the three-phase full-controlled bridge power module for achieving different switch combinations of the three bridge arm power modules; the basic converter module is integrated with a converter main controller for controlling an output current of a converter, and intelligent recognition and on-line hot plugging of a converter power unit can be achieved through a converter modular intelligent combination method; the converter controller comprises a main control unit used for achieving basic control of grid connection and a wind driven generator; the main control unit comprises an active circulation control module, a grid-connected current harmonic optimization control module, a converter thermal stress balance control module, a parallel current-sharing control module, a converter stability control module, and a power grid impedance self-adaptive control module.

As a preferred embodiment of the modular intelligent combined wind power converter provided by the present disclosure, wherein a modular intelligent combination method adopted by the wind power converter comprises constructing a modular combination capacity-expanded converter system architecture, wherein a circuit structure of the converter system architecture is implemented as follows: connecting a terminal 4 of a basic converter module M1N to a terminal 4 of a basic converter module M2N, and connecting a terminal 5 of the basic converter module M1N to a terminal 5 of the basic converter module M2N; connecting a terminal 1 of a basic converter module M1[N-1] to a terminal 1 of the basic converter module M1N, connecting a terminal 2 of the basic converter module M1[N-1] to a terminal 2 of the basic converter module M1N, connecting a terminal 3 of the basic converter module M1[N-1] to a terminal 3 of the basic converter module M1N; connecting a terminal 1 of a basic converter module M2[N-1] to a terminal 1 of the basic converter module M2N, connecting a terminal 2 of the basic converter module M2[N-1] to a terminal 2 of the basic converter module M2N, and connecting a terminal 3 of the basic converter module M2[N-1] to a terminal 3 of the basic converter module M2N; and each basic converter module is provided with a receiving optical fiber RX and a transmitting optical fiber TX which can be connected to the main control unit of the main controller in different ways.

As a preferred embodiment of the modular intelligent combined wind power converter provided by the present disclosure, wherein current control is achieved by a control unit in each basic converter module, a power module expansion automatic identification circuit is used for identifying whether a new basic power module is accessed or not and achieving an on-line hot plugging function of the basic power module through the main controller of the wind power converter, and a control power module takes power from an alternating-current (AC) terminal and a direct-current (DC) terminal to supply power to a control circuit.

As a preferred embodiment of the modular intelligent combined wind power converter provided by the present disclosure, wherein the three-phase full-controlled bridge power module comprises a power unit and a control unit, wherein the power unit comprises three same bridge arm power modules, a port 1 of a bridge arm power module A, a port 1 of a bridge arm power module B and a port 1 of a bridge arm power module C are connected together to form a DC port P of the power unit; a port 3 of the bridge arm power module A, a port 3 of the bridge arm power module B and a port 3 of the bridge arm power module C are connected together to form a DC port N of the power unit; a port 2 of the bridge arm power module A is an AC port A of the power unit; a port 2 of the bridge arm power module B is an AC port B of the power module; and a port 2 of the bridge arm power module C is an AC port C of the power unit.

As a preferred embodiment of the modular intelligent combined wind power converter provided by the present disclosure, wherein the control unit comprises a full FPGA controller receiving control command words transmitted from the main controller through a high-speed communication interface, and a format of the control command words being as follows:

| ID | SYN | TSA | DA | SA | TSB | DB | SB | TSC | DC | SC |
|----|-----|-----|-----|-----|-----|-----|-----|-----|-----|-----| wherein ID represents an identification code of the power unit; SYN is synchronous frame data; TSA represents a control cycle of the bridge arm power module A; DA represents a turn-on duty ratio of the bridge arm power module A; SA represents a phase shift angle of the bridge arm power module A; TSB represents a control cycle of the bridge arm power module B; DB represents a turn-on duty ratio of the bridge arm power module B; SB represents a phase shift angle of the bridge arm power module B; TSC represents a control cycle of the bridge arm power module C; DC represents a turn-on duty ratio of the bridge arm power module C; and SC represents a phase shift angle of the bridge arm power module C.

As a preferred embodiment of the modular intelligent combined wind power converter provided by the present disclosure, wherein the bridge arm power unit comprises achieving a bridge arm power module by connecting at least one of the bridge arm power units in parallel, and the current-sharing control of bridge arm basic units in parallel connection is achieved through self-adaptive current-sharing control, the control being as follows: forming the bridge arm power unit by n same bridge arm basic units and the intelligent driving unit of the power device, sending, by each bridge arm, currents and switch-on voltages of an upper switch tube and a lower switch tube to a bridge arm module controller FPGA (field-programmable gate array), and computing, by the controller FPGA, an average current $i_{avg}$ according to the currents of various bridge arms; when the current $i_{ci}$ of the i-th bridge arm is more than $i_{avg}$, reducing a driving voltage corresponding to the tube, and when the current $i_{ci}$ of the i-th bridge arm is less than $i_{avg}$, increasing the driving voltage corresponding to the tube, wherein a computational formula of a driving voltage variation is:

$$\Delta U_{Gi} = K_{G1}K_{G2}(i_{avg} - i_{ci}) = K_{G1}K_{G2}\left(\frac{1}{n}\sum_{i=1}^{n}i_{ci} - i_{ci}\right)$$

wherein $K_{G1}$ is a coefficient of relationship of the driving voltage and saturation voltage drop of the power device; and $K_{G2}$ is a coefficient of relationship of the saturation voltage drop and a current of the power device.

As a preferred embodiment of the modular intelligent combined wind power converter provided by the present disclosure, wherein the intelligent driving unit comprises achieving accurate turn-on and turn-off of a separate power device by adopting an intelligent driving control method, which is implemented as follows: receiving, by the FPGA controller in the intelligent driving unit in the power device, a turn-on time instruction and a turn-off time instruction of a power tube through a high-speed serial communication; receiving a switching signal of the power tube through a digital interface, wherein the current $i_c$ and tube voltage drop $U_{cc}$ of the power switch tube are accessed to the FPGA through an analog signal conditioning circuit and an AD converter; according to a relational table of turn-on time and turn-off time with respect to the driving voltage and the current of the power switch tube respectively, determining an output voltage and current of a programmable power supply, and selecting to turn on and turn off a driving resistor by controlling a driving resistor matrix, thus achieving accurate turn-on and turn-off of the power device; and accurately determining, by the intelligent driving unit, the turn-on time and the turn-off time of the power device, and transmitting the turn-on time and the turn-off time to the controller of the bridge arm power unit through the high-speed serial communication.

As a preferred embodiment of the modular intelligent combined wind power converter provided by the present disclosure, wherein determining the turn-on time and the turn-off time of the power device comprises: transmitting, by the controller of the bridge arm power unit, a driving voltage, a driving current, and a turn-on driving resistor setting value as well as a turn-off driving resistor setting value to the controller of the intelligent driving unit of the power device; transmitting, by the controller of the bridge arm power unit, driving test signals to the controller of the intelligent driving unit of the power device at intervals; controlling, by the controller of the intelligent driving unit, the power device to be switched on at intervals, and sequentially detecting the switch-on time and the turn-off time of the power device per time; transmitting, by the controller of the intelligent driving unit, the switch-on time and the turn-off time of the power device to the controller of the bridge arm power module; computing, by the controller of the bridge arm power unit, an average value of the switch-on time and the turn-off time of all bridge arm power devices in parallel connection as the turn-on time instruction and the turn-off time instruction of the power tube.

As a preferred embodiment of the modular intelligent combined wind power converter provided by the present disclosure, wherein the main control unit comprises a DSP (digital signal processor) module and FPGA module; the FPGA comprises a high-speed serial communication interface, a serial-parallel conversion interface, a high-speed parallel interface, a FIFO, and an SRAM; the high-speed serial communication interface is used for synchronously receiving basic information of 2N converter modules, temporarily storing the information in the FIFO under the control of a logic and control processing module, and further storing the information in the SRAM, and the information of a converter power circuit can be ultimately sent to the DSP module through the high-speed parallel interface; the DSP module comprises a high-speed parallel interface, a communication interface, an encoder interface, an analog signal interface, a digital signal interface, and a software function module, wherein the high-speed parallel interface is used for performing mass data high-speed communication with the FPGA module; the communication interface is used for performing real-time communication with a fan master control or other interface equipment; the encoder interface is used for being connected to a power generator to acquire rotational speed and angle information of the power generator; the analog signal interface is used for detecting a state of a power grid side accessed by the wind power converter and signals such as temperature, humidity and the like in a converter cabinet; and the digital signal interface is used for detecting state signals of other peripherals.

As a preferred embodiment of the modular intelligent combined wind power converter provided by the present disclosure, wherein the control unit of each basic converter module is used for controlling an output current of the basic converter, with a control structure comprising: obtaining a frequency $\omega_z$ from a three-phase voltage of the converter by a zero-crossing point detection circuit, and meanwhile, inputting the three-phase voltage of the converter to a three-phase phase-locked loop (PLL) after being detected by a voltage sensor, thus obtaining an angle $\theta_p$ and a frequency $\omega_p$; introducing a variable $\omega_g$, $\theta_g$ and a symbol FT, wherein $\omega_g$ represents a voltage angular frequency, $\theta_g$ represents a voltage phase angle, and the FT represents a state of the voltage sensor; when FT=0, a value of $\omega_g$ being $\omega_p$, and a value of $\theta_g$ being $\theta_p$; when FT=1, a value of $\omega_g$ being $\omega_z$, and a value of $\theta_g$ being $\theta_c$; performing a three-phase static to two-phase rotation coordinate transformation on a three-phase current of the converter to obtain $i_d$ and $i_q$; evaluating a difference value between given currents $i_{d\_ref}$ and $i_{q\_ref}$ and the currents $i_d$ and $i_q$ respectively, then obtaining $u_d$ and $u_q$ from difference values therefrom by a PI regulator and then an amplitude limiting link, performing two-phase rotation to three-phase static coordinate transformation on the $u_d$ and the $u_q$ to obtain three-phase modulation wave voltages $u_{ma}$, $u_{mb}$ and $u_{mc}$, and driving a three-phase power module by space vector modulation; obtaining $\Delta\theta_e$ from the sum of the voltage $u_q$ and coupling term $\Delta u_q$ thereof by a gain integrator; and subtracting $\Delta\theta_e$ from the signal $\omega_g$ by an integrator to obtain $\theta_e$.

As a preferred embodiment of the modular intelligent combined wind power converter provided by the present disclosure, wherein the control power module comprises a control power supply which is provided with three AC input ports and two DC input ports; the AC ports are used for connecting a three-phase AC voltage, and the DC ports are used for connecting a DC voltage; the three-phase AC voltage is connected to a DC-DC converter 3 after passing through a uncontrolled rectifier, the DC voltage is connected to a DC-DC converter 2, second outputs of the DC-DC converter 2 and the DC-DC converter 3 are connected to two input ports of a DC-DC converter 5, and an output port of the DC-DC converter 5 charges a battery unit through a diode D5; an output of the battery unit is connected to an input of a DC-DC converter 1 through a diode D4, the DC-DC converter 1 outputs a stable DC voltage Udc1, the DC-DC converter 2 outputs a stable DC voltage Udc2, and the DC-DC converter 3 outputs a stable DC voltage Udc3; an output of the DC-DC converter 1 is connected to an input of the DC-DC converter 4 through a diode D1, an output of the DC-DC converter 2 is connected to an input of a DC-DC converter 4 through a diode D2, an output of the DC-DC converter 3 is connected to an input of the DC-DC converter 4 through a diode D3, and the DC-DC converter outputs the stable DC voltage to supply power to the basic converter module.

The present invention provides an active circulation control method based on a modular intelligent combined wind power converter, thermal balance of the converter is achieved by adopting multi-mode active circulation control, comprising the following operating modes:

mode 1: a positive-sequence active circulation control mode, wherein multiple switches S1, S2 and S3 are all located at a position 1, in the modular combined converter, a positive-sequence circulating current with an amplitude $i_{cp}$ flows in the converters, an additional component $i_{di\_cp}$ is added to a d-axis reference current of each converter, an expression thereof satisfying:

$$\begin{cases} i_{cp} = \sum_{i=1}^{m} k_i \cdot i_{di\_cp} \\ i_{cp} = -\sum_{i=m}^{n} k_i \cdot i_{di\_cp} \\ i_{qi\_cp} = i_{zi\_cp} = 0 \end{cases}$$

mode 2: a negative-sequence active circulation control mode, wherein multiple switches S1, S2 and S3 are all located at the position 1, in the modular combined converter under the mode, a negative-sequence circulating current with an amplitude $i_{cp}$ flows in the converters, and an additional component $i_{di\_cp}$ is added in the d-axis reference current of each converter, an expression thereof satisfying:

$$\begin{cases} i_{cp} = \sum_{i=1}^{m} k_i \cdot i_{di\_cpm} \\ i_{cp} = -\sum_{i=m}^{n} k_i \cdot i_{di\_cpm} \\ i_{di\_cp} = i_{di\_cpm} \cos(2\omega t + \phi), i_{qi\_cp} = i_{zi\_cp} = 0 \end{cases}$$

mode 3: a reactive active circulation control mode, wherein multiple switches S1, S2 and S3 are all located at a position 2, in the modular combined converter under the mode, a reactive circulating current with an amplitude $i_{cp}$ flows in the converters, and an additional component $i_{qi\_cp}$ is added in the d-axis reference current of each converter, an expression thereof satisfying:

$$\begin{cases} i_{cp} = \sum_{i=1}^{m} k_i \cdot i_{qi} \\ i_{cp} = -\sum_{i=m}^{n} k_i \cdot i_{qi} \\ i_{di\_cp} = i_{zi\_cp} = 0 \end{cases}$$

and mode 4: a zero-sequence active circulation control mode, wherein multiple switches S1, S2 and S3 are all located at a position 3, in the modular combined converter under the mode, a zero-sequence circulating current with an amplitude $i_{cp}$ flows in the converters, and an additional component $i_{zi\_cp}$ is added in the d-axis reference current of each converter, an expression thereof satisfying:

$$\begin{cases} i_{cp} = \sum_{i=1}^{m} k_i \cdot i_{zi} \\ i_{cp} = -\sum_{i=m}^{n} k_i \cdot i_{zi} \\ i_{di\_cp} = i_{qi\_cp} = 0 \end{cases}$$

The present invention provides a grid-connected current harmonic optimization control method based on a modular intelligent combined wind power converter, wherein harmonic optimization control of a grid-connected current is achieved by adopting a variable switching frequency control method, comprising the following steps: increasing a switching frequency at lower power, and reducing magnitude of harmonics at the low power; equally dividing a wind power operation working condition from 0.2 pu-1 pu in accordance with a step length of 0.2 pu; when the converter operates in a state of 0-0.2 pu, selecting the switching frequency to be 5.1 KHz, wherein the switching frequency is reduced by 0.3 KHz every time the power is increased by 0.2 pu; when the converter is reduced to 0.78 pu from a rated working condition, increasing the switching frequency by 0.3 KHz to form power-frequency hysteresis of 0.02 pu, and so on as the power is reduced; by measuring the magnitude of the grid-connected current, computing an effective value thereof, and judging a power change direction thereof, reading a switching frequency value stored in a memory in advance through table look-up, and sending the switching frequency value back to a PWM generator to achieve the variable switching frequency control, thus reducing the harmonic of the grid-connected current in a low-power state.

The present invention provides a converter thermal stress balance control method based on a modular intelligent combined wind power converter, wherein the converter thermal stress balance control method is achieved by performing change control on the switching frequency in a current cyclic wave, comprising the following steps: dividing the grid-connected current into 40 equal parts in one cycle according to the phase; the highest switching frequency at 0-0.05 pi being 2100 Hz, reducing the switching frequency by 90 Hz every 0.05 pi until reaching a current peak value at 0.5 pi, then gradually increasing the switching frequency, and so on; making the current phase correspond to the switching frequency, and storing the current phase in a memory in advance; detecting a three-phase current of a power grid, and detecting a phase angle of the three-phase current; substituting the detected phase angle into a table stored in advance to obtain a corresponding switching frequency, and transmitting the corresponding switching frequency to a PWM generator.

The present invention provides a parallel current-sharing control method based on a modular intelligent combined wind power converter, wherein parallel control of a modular combined voltage source type wind power converter is achieved by adopting a current-sharing control method, comprising the following steps: computing reactive power of a grid-connected side according to a three-phase grid-connected voltage and current of a grid-side converter module 1; obtaining $\Delta u_{rl}$ from a difference value between the given reactive power and the actual reactive power by a PI regulator; obtaining a reference value of an angle from a DC voltage by a proportional integrator; performing Park transformation on the three-phase current to obtain $i_{d1}$ and $i_{q1}$, further obtaining an average current of n grid-side converters as:

$$\begin{cases} i_{davg} = \sum_{i=1}^{n} i_{di} \\ i_{qavg} = \sum_{i=1}^{n} i_{qi} \end{cases}$$

obtaining $\Delta\theta$ from a difference value between the average current $i_{davg}$ and sum of $i_{d1}$ by the PI regulator; obtaining $\Delta u_t$ from a difference value between the average current $i_{qavg}$ and sum of $i_{q1}$ by the PI regulator, and then respectively obtaining a phase and an amplitude of a modulation wave as:

$$\begin{cases} \theta = \frac{\omega_0}{s} u_{dc} + \left(K_{ip} + \frac{K_{ii}}{s}\right)\left(\sum_{i=1}^{n} i_{di} - i_{d1}\right) \\ u_t = u_{t0} + \left(K_{Qp} + \frac{K_{Qi}}{s}\right)(Q_{gref} - Q_g) + \left(K_{ip} + \frac{K_{ii}}{s}\right)\left(\sum_{i=1}^{n} i_{dq} - i_{dq}\right) \end{cases}$$

and obtaining a three-phase modulation wave according to the phase angle and the magnitude of the modulation wave, and driving the grid-side converters through PWM modulation.

The present invention provides a converter stable control method based on a modular intelligent combined wind power converter, wherein equivalent impedance of a grid-connected side converter of the wind power converter in different frequency bands or the phase angle margin at the corresponding frequency band can be adjusted by arranging different impedance reshaping loops in different links of a current loop, and then the grid-connected stability of the wind power converter is improved, comprising the following steps: feeding back a current error to an output of the current loop through a control link Dc(s) to form an impedance reshaping loop 1; adding a grid-connected point voltage to a given reference value of the current loop through IPLL(s) to form an impedance reshaping loop 2; and adding the grid-connected point voltage to a control output of the current loop through Df (s) and multiplied by gain Kf to form an impedance reshaping loop 3.

The present invention provides a power grid impedance self-adaptive control method based on a modular intelligent combined wind power converter, wherein current loop self-adaptive control of the grid-connected side converter of the wind power converter is achieved through on-line detection of the power grid impedance, comprising the following steps: determining initial control parameters of a current loop control unit, a resonance damping control unit, an impedance reshaping control unit and a phase-locked loop control unit according to basic parameters of a system; achieving measurement of grid-connected point impedance parameters and a system resonant frequency point by injecting a small-amplitude characteristic frequency voltage disturbance signal into a grid-connected point; designing a resonance damping controller of the grid-connected converter by connecting a multi-frequency wave trap in series with an adjustable gain link, thus achieving broadband resonance active damping control of the grid-connected converter; designing a current controller of the grid-connected converter by adopting a proportional multi-quasi-resonance control method and an internal model control method, thus achieving suppression control of the grid-connected converter on a harmonic resonance current; computing stability margins of the system at different frequency points under the current control parameters, and determining a frequency band range with smaller stability margins; performing impedance reshaping on the frequency points with insufficient stability margins of the grid-connected converter by adopting a method of adding a frequency selection network link to a voltage feedforward loop and designing a current loop tracking error control loop; through a controller parameter automatic tuning unit, computing the control loop parameters of the converter in real time according to the needs of the system full-band stability margin by taking the obtained grid-connected point impedance parameters and the system resonant frequency as basic parameters; and inputting the calculated control parameters to the current loop control unit, the resonance damping control unit, the impedance reshaping control unit and the phase-locked loop control unit to update the control parameters of the original system.

The present invention has the beneficial effects that a structure and a method of a modular intelligent combined wind power converter are provided, the accurate turn-on and turn-off of the bridge arm power switch are controlled by intelligent driving of a separate power device, and the current-sharing control on the bridge arm basic units in parallel connection is achieved through self-adaptive current-sharing control, thus achieving the purpose of connecting multiple power device bridge arms in parallel by using the separate power device; a three-phase full-controlled bridge power module is formed by using basic power arm power modules, and then forms a basic converter module together with an electric reactor, a capacitor, a fuse, and a circuit breaker, and rapid capacity expansion of the converter is achieved through serial/parallel combination of the converter modules; the current balance of the multi-loop parallel voltage source wind power converter can be achieved by adopting current sharing control on the converter modules, and thermal balance of the multi-parallel converter is achieved through active circulation control and variable switching frequency control methods; rapid increase of the capacity of the converter can be achieved by a converter modular combination and control method, and a large-scale high-capacity wind power converter is achieved by utilizing a single-variety power element. According to the method, the combination of a plurality of converter loop modules is allowed, thus the specification of a core component of the converter is reduced by 90%, the application that a single-specification power device covers the capacity below 10MW is achieved, and the needs of rapid development of the wind power for converters with multi-capacity specification and the large-scale production problem are solved.

BRIEF DESCRIPTION OF THE DRAWINGS

To describe the technical solutions in the embodiments of the present invention more clearly, the accompanying drawings required for describing the embodiments are briefly introduced below. Apparently, the accompanying drawings in the following description show merely some embodiments of the present invention, and those of ordinary skill in the art may still derive other drawings from these accompanying drawings without creative efforts. Wherein.

DETAILED DESCRIPTION OF THE EMBODIMENTS

Figure 1:
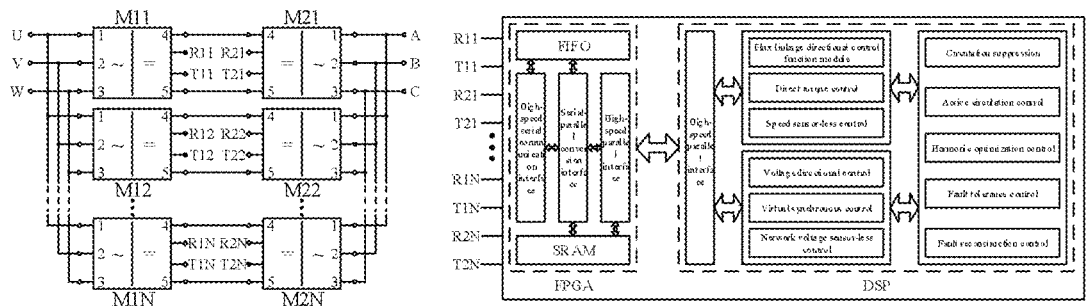
FIG. 1 is a structure diagram of a modular combined wind power converter system in accordance with the present invention.

To make the objectives, the features and the advantages of the present invention be more apparent and understandable, the specific embodiments of the present invention are described in detail below with reference to the accompanying drawings of description. Apparently, the described embodiments are merely a part rather than all of the embodiments of the present invention. All other embodiments obtained by those of ordinary skill in the art based on the embodiments of the present invention without creative efforts shall fall within the scope of protection of the present invention.

Numerous specific details are set forth in the following description to provide a thorough understanding of the present invention. However, the present invention may be put into practice in other ways than those described herein, those skilled in the art may make similar generalization without departing from the connotation of the present invention, and the present invention is therefore not to be limited by the specific embodiments disclosed below.

Secondly, "one embodiment" or "an embodiment" referred to herein means particular features, structures, or characteristics that may be included in at least one implementation of the present invention. The appearances of "in one embodiment" in different places in the specification do not all referring to the same embodiment, nor separate or selective embodiments mutually exclusive with other embodiments.

The present invention is described in detail with reference to diagrams, when describing the embodiments of the present invention in detail, cross-sectional views illustrating device structures are not partially enlarged to scale for ease of explanation, and the diagrams are merely examples and are not intended to limit the scope of protection of the present invention. In addition, three-dimensional spatial dimensions of length, width and depth should be included in actual fabrication.

Meanwhile, in the description of the present invention, it should be noted that the orientation or position relation indicated by "upper, lower, inner and outer" and the like in the terms is based on the orientation or position relation shown in the drawings, and is only used for facilitating the description of the present invention and simplifying the description rather than indicating or implying that the device or element referred to must have a particular orientation, be constructed and operated in a particular orientation, and thus is not to be construed as a limitation on the present invention. In addition, the terms "first, second or third" are used for descriptive purposes only and is not to be construed as indicating or implying relative importance.

Unless expressly specified and limited otherwise, the terms "mounting, connecting with each other, and connection" should be understood in broadly, for example, may be fixed connection, detachable connection, or integral connection; it may also be mechanical connection, electric or direct connection, or may be connected to each other through an intermediate medium, or it may be an internal communication of two elements. For those of ordinary skill in the art, specific meaning of the terms in the present invention may be understood in specific cases.

Embodiment 1

The embodiment provides a modular intelligent combined wind power converter, which comprises a modular combination capacity-expanded converter system architecture, a modular combination capacity-expanded converter system hardware architecture, a three-phase full-controlled bridge power module, a bridge arm power unit, a power device intelligent driving unit, a determination method of a turn-on time instruction and a turn-off time instruction of a power switch tube, a main control unit of a modular converter, a control unit of a basic converter module (i.e., the minimum power unit), a control power module, a power module intelligent expansion automatic identification circuit of the modular converter, and an information interaction of the modular converter, an active circulation control method of the modular converter, a grid-connected current harmonic optimization control method, a converter thermal stress balance control method, a parallel current-sharing control method under the modular converter voltage source control, a converter stable control method and a power grid impedance self-adaptive control method which are adopted by the wind power converter based on the modular intelligent combination.

More specifically, a basic element of the wind power converter is separate bridge arm power devices, a plurality of bridge arm power devices are connected in parallel to form a high-capacity bridge arm power module, three bridge arm power modules form a three-phase full-controlled bridge power module, three-phase full-controlled bridge power module is configured with an electric reactor, a capacitor, a fuse and a circuit breaker to form a basic converter module, and the basic converter module forms a high-capacity wind power converter through a modular intelligent combination method; accurate turn-on and turn-off of a bridge arm power switch may be controlled by intelligent driving of a separate bridge arm, a current-sharing controller is integrated in the basic bridge arm power module for achieving current sharing of each bridge arm in the bridge arm power module; a driving controller is integrated in the three-phase full-controlled bridge for achieving different switch combinations of the three bridge arm power modules; the minimum power unit of the converter is integrated with a converter controller for achieving control on an output current of the converter; and intelligent recognition and on-line hot plugging of a converter power unit can be achieved through a converter modular intelligent combination method; a main control unit of the converter is used for achieving basic control on grid connection and a wind driven generator; the main control unit is integrated with a plurality of functional modules, wherein an active circulation control module is used for achieving reactive circulation control among various parallel converter units, a condensation phenomenon on a radiator of the power module may be effectively suppressed, the harmonic optimization of the total current can be achieved by grid-connected current harmonic optimization control, and the thermal balance of the power device in one current cycle can be achieved by converter thermal stress balance control.

More specifically, the modular combined capacity-expanded converter system architecture in the embodiment comprises a separate module capable of achieving rapid capacity expansion and large-scale production in a parallel mode through basic converter modules on hardware, and a set of codes shared through configuration reconstruction on the basic converter modules on software. Current control and modulation are achieved by the basic converter modules, and basic functions of the wind power converter are achieved in the main controller, wherein implementation method of a circuit structure thereof is described as follows:

connecting a terminal 4 of a basic converter module M11 to a terminal 4 of a basic converter module M21, and connecting a terminal 5 of the basic converter module M11 to a terminal 5 of the basic converter module M21; connecting a terminal 4 of a basic converter module M12 to a terminal 4 of a basic converter module M22, and connecting a terminal 5 of the basic converter module M12 to a terminal 5 of the basic converter module M22, and so on, connecting a terminal 4 of a M1N to a terminal 4 of a M2N, and connecting a terminal 5 of the M1N to the terminal 5 of the M2N;

connecting a terminal 1 of the basic converter module M11 to a terminal 1 of the basic converter module M12, connecting a terminal 2 of the basic converter module M11 to a terminal 2 of the basic converter module M12, and connecting a terminal 3 of the basic converter module M11 to a terminal 3 of the basic converter module M12; and connecting a terminal 1 of the basic converter module M21 to a terminal 1 of the basic converter module M22, connecting a terminal 2 of the basic converter module M21 to a terminal 2 of the basic converter module M22, and connecting a terminal 3 of the basic converter module M21 to a terminal 3 of the basic converter module M22; and so on, connecting a terminal 1 of a M1[N-1] to a terminal 1 of the M1N, connecting a terminal 2 of the M1 [N-1] to a terminal 2 of the M1N, and connecting a terminal 3 of the M1[N-1] to a terminal 3 of the M1N; connecting a terminal 1 of a M2[N-1] to a terminal 1 of the M2N, connecting a terminal 2 of the M2[N-1] to a terminal 2 of the M2N, and connecting a terminal 3 of the M2[N-1] to a terminal 3 of the M2N;

and each basic converter module is provided with a receiving optical fiber RX and a transmitting optical fiber TX which can be connected to the main control unit of the main controller through different ways.

Further, the hardware architecture of the modular combined capacity-expanded converter comprises forming the basic converter module by the three-phase full-controlled bridge power module, the electric reactor, the capacitor, the fuse, and the circuit breaker, and achieving the current control of the basic converter module through the control unit of the basic converter unit; the power module expansion automatic identification circuit is used for identifying whether a new basic power module is accessed or not and achieving an on-line hot plugging function of the basic power module through the main controller of the wind power converter, and the control power supply takes power from an alternating-current (AC) terminal and a direct-current (DC) terminal to supply power to a control circuit, wherein an implementation method of the circuit structure thereof is described as follows:

the power circuit having three AC terminals, two DC terminals, and two optical fiber interfaces for the power circuit, wherein the power circuit may be specifically described as follows: the power circuit of each converter module comprises one three-phase full-controlled bridge power unit, a DC terminal of the three-phase full-controlled bridge is connected to a DC capacitor through two fuses, the AC terminal of the three-phase full-controlled bridge is connected to an input terminal of a three-phase electric reactor, an output terminal of the three-phase electric reactor is connected to an input terminal of a three-phase circuit breaker through three fuses, an output terminal of the three-phase electric reactor are connected to three resistors through the three fuses, three resistors are connected to three AC capacitors, and the three AC capacitors are connected together by starlink; the power circuit of each converter module comprises a DC voltage sensor, two AC voltage sensors, and two AC current sensors, wherein the DC voltage sensor is connected to two terminals of a DC capacitor; the first AC voltage sensor is connected to a first terminal and a second terminal of an output side of the three-phase electric reactor, the second AC voltage sensor is connected to a second terminal and a third terminal of an output side of the three-phase electric reactor; the first AC current sensor is connected into a first output terminal of the output of the three-phase electric reactor in series, and the second AC current sensor is connected into a second output terminal of the output of the three-phase electric reactor in series;

the control circuit comprising a power interface, an analog interface, a PWM interface, an IO interface, a communication interface, and an optical fiber interface, wherein the analog interface is connected to an analog signal of the power circuit, the PWM interface is connected to a driving signal of the power circuit, the IO interface is connected to an IO signal of the power circuit, the power interface is externally connected to a control power supply, the optical fiber interface is connected to a main controller of the converter, and the communication interface is connected to external communication equipment. The input of the control power module is connected to the AC terminal and the DC terminal of the power circuit, and the output thereof is connected to the control circuit.

Further, the three-phase full-controlled bridge power module in the embodiment comprises a power unit and a control unit, a circuit structure and a control method thereof being described as follows:

the power unit consisting of three same bridge arm power modules, wherein a port 1 of a bridge arm power module A, a port 1 of a bridge arm power module B and a port 1 of a bridge arm power module C are connected together to form a DC port P of the power unit; a port 3 of the bridge arm power module A, a port 3 of the bridge arm power module B and a port 3 of the bridge arm power module C are connected together to form a DC port N of the power unit; a port 2 of the bridge arm power module A is an AC port A of the power unit; a port 2 of the bridge arm power module B is an AC port B of the power module; and a port 2 of the bridge arm power module C is an AC port C of the power unit;

the control unit consisting of a full-FPGA controller receiving control command words sent from the main controller through a high-speed communication interface, and a format of the control command words being as follows:

| ID | SYN | TSA | DA | SA | TSB | DB | SB | TSC | DC | SC | wherein ID represents an identification code of the power unit; SYN is synchronous frame data; TSA represents a control cycle of the bridge arm power module A; DA represents a turn-on duty ratio of the bridge arm power module A; SA represents a phase shift angle of the bridge arm power module A; TSB represents a control cycle of the bridge arm power module B; DB represents a turn-on duty ratio of the bridge arm power module B; SB represents a phase shift angle of the bridge arm power module B; TSC represents a control cycle of the bridge arm power module C; DC represents a turn-on duty ratio of the bridge arm power module C; and SC represents a phase shift angle of the bridge arm power module C.

Further, the bridge arm power unit comprises achieving bridge arm power module by adopting a method for connecting a plurality of same bridge arm basic units in parallel, the current sharing control of the bridge arm basic units in parallel connection is achieved by a self-adaptive current-sharing control method, and an implementation method being described as follows:

forming the bridge arm power unit by n same bridge arm basic units and the intelligent driving unit of the power device; sending, by each bridge arm, currents and switch-on voltages of an upper switch tube and a lower switch tube to a bridge arm module controller FPGA (field-programmable gate array); computing, by the FPGA, an average current $i_{avg}$ according to the currents of various bridge arms, when the current $i_{ci}$ of the i-th bridge arm is greater than $i_{avg}$, reducing a driving voltage corresponding to the tube; and when the current $i_{ci}$ of the i-th bridge arm is less than $i_{avg}$, increasing the driving voltage corresponding to the tube, and a computational formula about the variation of the driving voltage being as follows:

$$\Delta U_{Gi} = K_{G1}K_{G2}(i_{avg} - i_{ci}) = K_{G1}K_{G2}\left(\frac{1}{n}\sum_{i=1}^{n}i_{ci} - i_{ci}\right)$$

wherein $K_{G1}$ is a coefficient of relationship of the driving voltage and saturation voltage drop of the power device; and $K_{G2}$ is a coefficient of relationship of the saturation voltage drop and a current of the power device.

Further, the intelligent driving unit of the power device comprises achieving accurate turn-on and turn-off of a separate power device by adopting an intelligent driving control method, and an implementation method thereof being described as follows:

receiving, by the FPGA controller in the intelligent driving unit of the power device, a turn-on time instruction and a turn-off time instruction of a power tube through a high-speed serial communication; receiving a switching signal of the power tube through a digital interface, wherein the current $i_c$ and tube voltage drop $U_{cc}$ of the power switch tube are accessed to the FPGA through an analog signal conditioning circuit and an AD converter; according to a relational table of turn-on time and turn-off time with respect to the driving voltage and the current of the power switch tube respectively, determining an output voltage and a current of a programmable power supply, and selecting to turn on and turn off a driving resistor by controlling a driving resistor matrix, thus achieving accurate turn-on and turn-off of the power device; and accurately computing, by the intelligent driving unit, the turn-on time and the turn-off time of the power device, and transmitting the turn-on time and the turn-off time to the controller of the bridge arm power unit through the high-speed serial communication.

Further, a determination method of the turn-on time instruction and the turn-off time instruction of the power switch tube in the embodiment is as shown in the following steps:

step one: transmitting, by the controller of the bridge arm power unit, a driving voltage, a driving current, and a turn-on driving resistor setting value as well as a turn-off driving resistor setting value to the controller of the intelligent driving unit of the power device;

step two: transmitting, by the controller of the bridge arm power unit, driving test signals to the controller of the intelligent driving unit of the power device at intervals;

step three: controlling, by the controller of the intelligent driving unit, the power device to be switched on at intervals, and sequentially detecting the switch-on time and the turn-off time of the power device per time;

step four: transmitting, by the controller of the intelligent driving unit, the switch-on time and the turn-off time of the power device to the controller of the bridge arm power module;

and step five: computing, by the controller of the bridge arm power unit, an average value of the switch-on time and the turn-off time of all bridge arm power devices in parallel connection as the turn-on time instruction and the turn-off time instruction of the power tube.

Further, the main control unit of the modular converter comprises that:

the system control unit comprises a DSP (digital signal processor) module and FPGA module; the FPGA comprises a high-speed serial communication interface, a serial-parallel conversion interface, a high-speed parallel interface, a FIFO, and an SRAM; the high-speed serial communication interface is used for synchronously receiving basic information of 2N converter modules, temporarily storing the information in the FIFO under the control of a logic and control processing module, and further storing the information in the SRAM, and then the information of a converter power circuit is ultimately sent to the DSP module through the high-speed parallel interface; the DSP module comprises a high-speed parallel interface, a communication interface, an encoder interface, an analog signal interface, a digital signal interface, and a software function module, wherein the high-speed parallel interface is used for performing mass data high-speed communication with the FPGA module; the communication interface is used for performing real-time communication with a fan master control or other interface equipment; the encoder interface is used for being connected to a power generator to acquire rotational speed and angle information of the power generator; the analog signal interface is used for detecting a state of a power grid side accessed by the wind power converter and signals such as temperature, humidity and the like in a converter cabinet; and the digital signal interface is used for detecting state signals of other peripherals; the software function module comprises a low-level function module and a top-level function module; the low-level function module comprises a flux linkage directional control function module, a direct torque control function module, a speed sensor-less function module, a voltage directional control function module, a virtual synchronous control function module, and a network voltage sensor-less function module; the top-level function module comprises a circulation suppression function module, an active circulation control function module, a harmonic optimization control function module, a fault tolerance control function module, and a fault reconstruction control function module. A total of N receiving optical fiber terminals and N optical fiber transmitting terminals of the system power module are connected to control circuit optical fiber ports of N power modules of the wind power converter.

In the embodiment, the control unit of the basic converter module has a function of controlling the output current of the basic converter, a control structure thereof being described as follows:

obtaining a frequency $\omega_z$ from a three-phase voltage of the converter by a zero-crossing point detection circuit, and meanwhile, inputting the three-phase voltage of the converter to a three-phase phase-locked loop (PLL) after being detected by a voltage sensor, thus obtaining an angle $\theta_p$ and a frequency $\omega_p$; introducing a variable $\omega_g$, $\theta_g$ and a symbol FT, wherein $\omega_g$ represents a voltage angular frequency, $\theta_g$ represents a voltage phase angle, and the FT represents a state of the voltage sensor; when FTT=0, a value of $\omega_g$ being $\omega_p$, and a value of $\theta_g$ being $\theta_p$; when FT=1, a value of $\omega_g$ being $\omega_z$, and a value of $\theta_g$ being $\theta_c$; performing a three-phase static to two-phase rotation coordinate transformation on a three-phase current of the converter to obtain $i_d$ and $i_q$; evaluating a difference value between given currents $i_{d\_ref}$ and $i_{q\_ref}$ and currents $i_d$ and $i_q$ respectively, then obtaining $u_d$ and $u_q$ from difference values therefrom by a PI regulator and then an amplitude limiting link, performing two-phase rotation to three-phase static coordinate transformation on the $u_d$ and the $u_q$ to obtain three-phase modulation wave voltages $u_{ma}$, $u_{mb}$ and $u_{mc}$, and driving a three-phase power module by space vector modulation; obtaining $\Delta\theta_e$ from the sum of the voltage $u_q$ and coupling term $\Delta u_q$ thereof by a gain integrator; and subtracting $\Delta\theta_e$ from the signal $\omega_g$ by an integrator to obtain $\theta_e$.

It should be noted that a circuit structure of the control power module in the embodiment is described as follows:

a control power supply is provided with three AC input ports and two DC input ports; the AC ports are used for connecting a three-phase AC voltage, and the DC ports are used for connecting a DC voltage; the three-phase AC voltage is connected to a DC-DC converter 3 after passing through a uncontrolled rectifier, the DC voltage is connected to a DC-DC converter 2, second outputs of the DC-DC converter 2 and the DC-DC converter 3 are connected to two input ports of a DC-DC converter 5, and output port of the DC-DC converter 5 charges a battery unit through a diode D5; an output of the battery unit is connected to an input of a DC-DC converter 1 through a diode D4, the DC-DC converter 1 outputs a stable DC voltage $U_{dc1}$, the DC-DC converter 2 outputs a stable DC voltage $U_{dc2}$, and the DC-DC converter 3 outputs a stable DC voltage $U_{dc3}$; an output of the DC-DC converter 1 is connected to an input of the DC-DC converter 4 through a diode D1, an output of the DC-DC converter 2 is connected to an input of a DC-DC converter 4 through a diode D2, an output of the DC-DC converter 3 is connected to an input of the DC-DC converter 4 through a diode D3, and the DC-DC converter outputs the stable DC voltage to supply power to the basic converter module.

Further, a circuit structure of the power module intelligent expansion automatic identification circuit of the modular converter is described as follows:

the power module expansion automatic identification circuit comprises power supplies, optocouplers, and a logic gate circuit, wherein the power module expansion automatic identification circuit can be specifically described as follows: a positive electrode of a power supply V1 is connected to a terminal 4 of the converter module 1, a terminal 4 of the converter module 2 is connected to a pin 1 of an optocoupler T1 through a resistor R11, and a pin 2 of the optocoupler T1 is connected to a negative electrode of the power supply V1; a positive electrode of a power supply V2 is connected to a terminal 5 of the converter module 1, a terminal 5 of the converter module 2 is connected to a pin 1 of an optocoupler T2 through a resistor R12, and a pin 2 of the optocoupler T2 is connected to a negative electrode of the power supply V2; a positive electrode of a power supply V3 is connected to a terminal 1 of the converter module 1, a terminal 1 of the converter module 2 is connected to a pin 1 of an optocoupler T3 through a resistor R13, and a pin 2 of the optocoupler T3 is connected to a negative electrode of the power supply V3; a positive electrode of a power supply V4 is connected to a terminal 2 of the converter module 1, a terminal 2 of the converter module 2 is connected to a pin 1 of an optocoupler T4 through a resistor R14, and a pin 2 of the optocoupler T4 is connected to a negative electrode of the power supply V4; a positive electrode of a power supply V5 is connected to a terminal 3 of the converter module 1, a terminal 3 of the converter module 2 is connected to a pin 1 of an optocoupler T5 through a resistor R15, and a pin 2 of the optocoupler T5 is connected to a negative electrode of the power supply V5; a +5V power supply is connected to a pin 4 of the optocoupler T1 through a resistor R21, the +5V power supply is connected to a pin 4 of the optocoupler T2 through a resistor R22, the +5V power supply is connected to a pin 4 of the optocoupler T3 through a resistor R23, the +5V power supply is connected to a pin 4 of the optocoupler T4 through a resistor R24, and the +5V power supply is connected to a pin 4 of the optocoupler T5 through a resistor R25; pins 3 of the optocoupler T1 to the optocoupler T5 are connected to the +5V power supply ground; pins 4 of the optocoupler T1 to the optocoupler T5 are connected to an input NOR gate 5; when the output S1 of the NOR gate is at a high level, the converter module 2 is judged to be accessed to a converter system, and the converter module 2 is allowed to work; and when the output S1 of the NOR gate is at a low level, the converter module 2 is judged to exit from the converter system, and the converter module 2 is forbidden to work.

The information interaction technology of the modular converter in the embodiment:

the information interaction between the modular converter and the main controller is achieved by adopting a serial data link communication technology, and a circuit structure thereof being described as follows:

a transmitting port of the main controller is connected to a receiving port R1C of the M11, a transmitting port T1C of the M11 is connected to a receiving port R2C of the M12, a transmitting port T2C of the M12 is connected to a receiving port R3C of the M13, and so on, a transmitting port T[N-1]C of the M1[N-1] is connected to a receiving port RNC of the M1N, and a transmitting port TNC of the M1N is connected to a receiving port RMC of the main controller.

The main controller transmits control information to the M11 through the TMC port, the M11 synchronously transmits the control information data out from the T1C port while receiving the control information data, and state information of the M11 is transmitted out from the T1C after the control information data is completely received; the M12 synchronously transmits the control information data out from the T2C port while receiving the control information, and state information of the M12 is transmitted out from the T2C port after the control information and the M11 state information are completely received; and so on, the M1N transmits the control information data out from the TNC port while receiving the control information, and the state information of the M1N is transmitted out from the TNC port after the control information and the M1[N-1] state information are completely received; and the main controller may receive state information of all power modules at the RMC port.

The embodiment provides an active circulation control method of a modular converter, thermal balance of the converter is achieved by adopting multi-mode active circulation control, an implementation method being described as follows:

three operating modes existing:

mode 1: a positive-sequence active circulation control mode, wherein multiple switches S1, S2 and S3 are all located at a position 1, in the modular combined converter, a positive-sequence circulating current with an amplitude $i_{cp}$ flows in the converters, an additional component $i_{di\_cp}$ is added to a d-axis reference current of each converter, an expression thereof satisfying:

$$\begin{cases} i_{cp} = \sum_{i=1}^{m} k_i \cdot i_{di\_cp} \\ i_{cp} = -\sum_{i=1}^{n} k_i \cdot i_{di\_cp} \\ i_{di\_cp} = i_{zi\_cp} = 0 \end{cases}$$

mode 2: a negative-sequence active circulation control mode, wherein multiple switches S1, S2 and S3 are all located at the position 1, in the modular combined converter under the mode, a negative-sequence circulating current with an amplitude $i_{cp}$ flows in the converters, and an additional component $i_{di\_cp}$ is added in the d-axis reference current of each converter, an expression thereof satisfying:

$$\begin{cases} i_{cp} = \sum_{i=1}^{m} k_i \cdot i_{di\_cpm} \\ i_{cp} = -\sum_{i=m}^{n} k_i \cdot i_{di\_cpm} \\ i_{di\_cp} = i_{di\_cpm}\cos(2\omega t + \phi),\ i_{qi\_cp} = i_{zi\_cp} = 0 \end{cases}$$

mode 3: a reactive active circulation control mode, wherein multiple switches S1, S2 and S3 are all located at a position 2, in the modular combined converter under the mode, a reactive circulating current with an amplitude $i_{cp}$ flows in the converters, and an additional component $i_{qi\_cp}$ is added in the d-axis reference current of each converter, an expression thereof satisfying:

$$\begin{cases} i_{cp} = \sum_{i=1}^{m} k_i \cdot i_{qi} \\ i_{cp} = -\sum_{i=m}^{n} k_i \cdot i_{qi} \\ i_{di\_cp} = i_{zi\_cp} = 0 \end{cases}$$

and mode 4: a zero-sequence active circulation control mode, wherein multiple switches S1, S2 and S3 are all located at a position 3, in the modular combined converter under the mode, a zero-sequence circulating current with an amplitude $i_{cp}$ flows in the converters, and an additional component $i_{zi\_cp}$ is added in the d-axis reference current of each converter, an expression thereof satisfying:

$$\begin{cases} i_{cp} = \sum_{i=1}^{m} k_i \cdot i_{zi} \\ i_{cp} = -\sum_{i=m}^{n} k_i \cdot i_{zi} \\ i_{di\_cp} = i_{qi\_cp} = 0 \end{cases}$$

Further, a grid-connected current harmonic optimization control method:

harmonic optimization control of the grid-connected current is achieved by adopting a variable switching frequency control method, an implementation method thereof being described as follows:

Under normal conditions, a PWM carrier frequency of the wind power converter, i.e., the switching frequency, is kept at a fixed value, and is set to be about 3 KHz in a high-power wind power occasion, and the switching frequency is gradually reduced along with the increase of the power, thus reducing the loss of the power device. However, the wind energy has random volatility, and the converter is not fully powered all the time. When the wind speed is relatively low, the converter operates at a reduced rate, and in the low power state, there are large harmonics in the grid-connected current if the low switching frequency continues to be used. The present disclosure provides a harmonic optimization control strategy with variable switching frequency to reduce the magnitude of harmonics at low power by increasing the switching frequency at the low power. Specifically, the wind power operating working conditions are equally divided from 0.2-1 pu in accordance with a step length of 0.2 pu. When the converter operates at a state of 0-0.2 pu, the switching frequency is selected to be 5.1 KHz, and the switching frequency is reduced by 0.3 KHz as the power is increased by 0.2 pu. In contrast, to avoid frequent switching of the switching frequency between the working conditions of the converter, when the converter is reduced to 0.78 pu from the rated working condition, the switching frequency is increased by 0.3 KHz, thus forming the power-frequency hysteresis of 0.02 pu, and so on as the power is reduced. By measuring the magnitude of the grid-connected current, computing an effective value thereof, and judging a power change direction thereof, reading a switching frequency value stored in a memory in advance through table look-up, and sending the switching frequency value back to a PWM generator to achieve the variable switching frequency control, thus reducing the harmonics of the grid-connected current in a low-power state.

The embodiment provides a converter thermal stress balance control method, a converter thermal stress balance control method is achieved by performing change control on the switching frequency in one current cyclic wave, and an implementation method thereof being described as follows:

The switching frequency of the high-power wind power converter cannot be set too high due to high current, generally about 2 KHz. The loss of a switching device is the main component of the loss of the wind power converter. The loss of the switching device is mainly related to the magnitude of the current and the switching frequency. When the grid-connected current is relatively high, the current harmonic is relatively low, it can be considered to reduce the switching frequency when the current is high while maintain the high switching frequency when the current is low, thus reducing the loss of the converter and improving the efficiency. Specifically, the grid-connected current is divided into 40 equal parts according to the phase in one cycle. the highest switching frequency at 0-0.05 pi is 2100 Hz, the switching frequency is reduced by 90 Hz every 0.05 pi until reaching a current peak value at 0.5 pi, then the switching frequency is gradually increased, and so on; the current phase is enabled to correspond to the switching frequency, and the current phase is stored in a memory in advance. A specific implementation method is: detecting a three-phase current of a power grid, and detecting a phase angle of the three-phase current; substituting the detected phase angle into a table stored in advance to obtain a corresponding switching frequency, and transmitting the corresponding switching frequency to a PWM generator. By dividing one current cyclic wave into 40 equal parts, different switching frequencies are adopted when the current is at different phases to reduce the switching frequency when the current is high, thus reducing the loss.

The embodiment provides a parallel current-sharing control method under the voltage source control of the modular converter, the parallel control of the modular combined voltage source type wind power converter is achieved by adopting a current-sharing method, and an implementation method thereof being described as follows:

computing reactive power of a grid-connected side according to a three-phase grid-connected voltage and current of a grid-side converter module 1; obtaining $\Delta u_{t1}$ from a difference value between the given reactive power and the actual reactive power by a PI regulator; obtaining a reference value of an angle from a DC voltage by a proportional integrator; performing Park transformation on a three-phase current to obtain $i_{d1}$ and $i_{q1}$, further obtaining an average current of n grid-side converters as follows:

$$\begin{cases} i_{davg} = \sum_{i=1}^{n} i_{di} \\ i_{qavg} = \sum_{i=1}^{n} i_{qi} \end{cases}$$

obtaining $\Delta\theta$ from a difference value between the average current $i_{davg}$ and sum of $i_{d1}$ by the PI regulator; obtaining $\Delta u_t$ from a difference value between the average current $i_{qavg}$ and sum of $i_{q1}$ by the PI regulator, and then respectively obtaining a phase and an amplitude of a modulation wave as:

$$\begin{cases} \theta = \dfrac{\omega_0}{s} u_{dc} + \left(K_{ip} + \dfrac{K_{ii}}{s}\right)\left(\sum_{i=1}^{n} i_{di} - i_{d1}\right) \\ u_t = u_{t0} + \left(K_{Qp} + \dfrac{K_{Qi}}{s}\right)(Q_{gref} - Q_g) + \left(K_{ip} + \dfrac{K_{ii}}{s}\right)\left(\sum_{i=1}^{n} i_{dq} - i_{dq}\right) \end{cases}$$

and obtaining a three-phase modulation wave according to the phase angle and the magnitude of the modulation wave, and driving the grid-side converters through PWM modulation.

A converter stable control method:

equivalent impedance of a grid-connected side converter of the wind power converter in different frequency bands or the phase angle margin at the corresponding frequency band can be adjusted by arranging different impedance reshaping loops in different links of a current loop, and then the grid-connected stability of the wind power converter is increased, and an implementation method thereof being described as follows: feeding back a current error to an output of the current loop through a control link Dc(s) to form an impedance reshaping loop 1; adding a grid-connected point voltage to a given reference value of the current loop through $I_{PLL}(s)$ to form an impedance reshaping loop 2; and adding the grid-connected point voltage to a control output of the current loop through Df (s) and multiplied by gain Kf to form an impedance reshaping loop 3.

A power grid impedance self-adaptive control method:

the current loop self-adaptive control of a grid-connected side converter of the wind power converter is achieved through on-line detection of the power grid impedance, specific implementation steps thereof comprising:

S1: determining initial control parameters of a current loop control unit, a resonance damping control unit, an impedance reshaping control unit and a phase-locked loop control unit according to basic parameters of a system;

S2: achieving measurement of grid-connected point impedance parameters and a system resonant frequency point by injecting a small-amplitude characteristic frequency voltage disturbance signal into a grid-connected point;

S3: designing a resonance damping controller of the grid-connected converter by connecting a multi-frequency wave trap in series with an adjustable gain link, thus achieving broadband resonance active damping control of the grid-connected converter;

S4: designing a current controller of the grid-connected converter by adopting a proportional multi-quasi-resonance control method and an internal model control method, thus achieving suppression control of the grid-connected converter on a harmonic resonance current;

S5: computing stability margins of the system at different frequency points under the current control parameters, and determining a frequency band range with smaller stability margins;

S6: performing impedance reshaping on the frequency points with insufficient stability margins of the grid-connected converter by adopting a method of adding a frequency selection network link to a voltage feedforward loop and designing a current loop tracking error control loop;

S7: through a controller parameter automatic tuning unit, computing the control loop parameters of the converter in real time according to needs of the system full-band stability margin by taking the obtained grid-connected point impedance parameters and the system resonant frequency as basic parameters;

S8: and inputting the calculated control parameters to the current loop control unit, the resonance damping control unit, the impedance reshaping control unit and the phase-locked loop control unit to update the control parameters of the original system, and returning to S2.

Embodiment 2

In the embodiment, a 4MW wind power converter is taken as an example, referring to the schematic of FIG. 1, a modular combined wind power converter is provided, which does not define the voltage class of a particular circuit, and generally employs a voltage source type pulse width modulation converter. By taking one 4MW wind power converter as an example, a total of 8 basic converter modules are required, respectively being M11-M14, M21-M24, and each basic converter module has a power of 1MW. AC sides of the M11-M14 are connected together in parallel to be connected to a wind driven generator; AC sides of the M21-M24 are connected together in parallel to be connected to an AC power grid; DC terminals of the M11 and M21 are connected together, and so on, DC terminals of the M14 and M24 are connected together, thus forming a wind power converter with power of 4MW; each basic converter module is provided with a receiving optical fiber RX and a transmitting optical fiber TX which can be connected to the main controller in different ways. In the embodiment, DC terminals of the M11 and M21, M12 and M22, M13 and M23, and M14 and M24 can be all connected together in parallel, and can also be connected in parallel by taking two groups as units, i.e., the DC terminals of M11, M21, M12 and M22 are connected together in parallel, and the DC terminals of M13, M23, M14 and M24 are connected together in parallel. In addition, four AC terminals of M11-M14 can be all connected together in parallel to be connected to a single-winding generator, and can also be connected in parallel by taking two groups as the units, i.e., the AC terminals of the M11 and the M12 are connected together in parallel and the AC terminals of the M13 and the M14 are connected together in parallel to be connected to a double-winding generator or a six-phase alternating current motor; or the AC terminals of the M11 and M12, and M13 and M14 can be connected to a 12-phase alternating current generator without connecting with each other.

Figure 2:
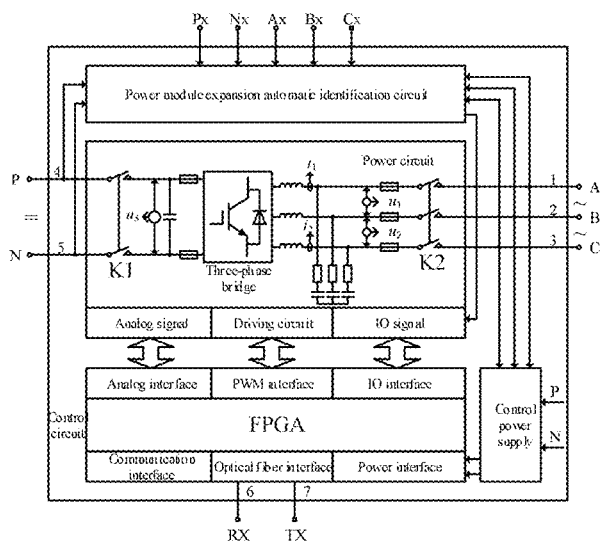
FIG. 2 is a structure diagram of a basic converter module of the modular combined wind power converter in accordance with the present invention.

As shown in FIG. 2, the basic converter module of the modular combined wind power converter comprises a power circuit, a control circuit, a control power supply, and a power module expansion automatic identification circuit. The power circuit is provided with three AC terminals, two DC terminals, and two optical fiber interfaces, wherein the power circuit may be specifically described as follows: the power circuit of each converter module comprises one three-phase full-controlled bridge power, the DC terminal of the three-phase full-controlled bridge is connected to a DC capacitor through two fuses, the AC terminal of the three-phase full-controlled bridge is connected to an input terminal of a three-phase electric reactor, an output terminal of the three-phase electric reactor is connected to an input terminal of a three-phase circuit breaker through three fuses, an output terminal of the three-phase electric reactor are connected to three resistors through three fuses, three resistors are connected to three AC capacitors, and the three AC capacitors are connected together by starlink; the power circuit of each converter module comprises a DC voltage sensor, two AC voltage sensors, and two AC current sensors, wherein the DC voltage sensor is connected to two terminals of a DC capacitor; the first AC voltage sensor is connected to a first terminal and a second terminal of an output side of the three-phase electric reactor, the second AC voltage sensor is connected to a second terminal and a third terminal of an output side of the three-phase electric reactor; the first AC current sensor is connected into a first output terminal of the output of the three-phase electric reactor in series, and the second AC current sensor is connected into a second output terminal of the output of the three-phase electric reactor in series; the control circuit comprises a power interface, an analog interface, a PWM interface, an IO interface, a communication interface, and an optical fiber interface, wherein the analog interface is connected to an analog signal of the power circuit, the PWM interface is connected to a driving signal of the power circuit, the IO interface is connected to an IO signal of the power circuit, the power interface is externally connected to a control power supply, the optical fiber interface is connected to a main controller of the converter, and the communication interface is connected to external communication equipment. The input of the control power supply is connected to the AC terminal and the DC terminal of the power circuit, and the output thereof is connected to the control circuit.

Figure 3:
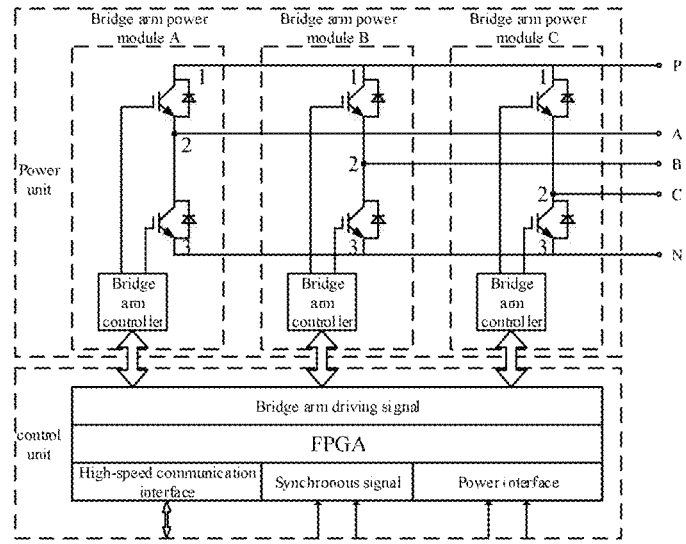
FIG. 3 is a diagram of a three-phase full-controlled bridge power module of the modular combined wind power converter in accordance with the present invention.

As shown in FIG. 3, the three-phase full-controlled bridge power module of the modular combined wind power converter comprises a power unit and a control unit, wherein the power unit is composed of three same bridge arm power modules, a port 1 of a bridge arm power module A, a port 1 of a bridge arm power module B and a port 1 of a bridge arm power module C are connected together to form a DC port P of the power unit; a port 3 of the bridge arm power module A, a port 3 of the bridge arm power module B and a port 3 of the bridge arm power module C are connected together to form a DC port N of the power unit; a port 2 of the bridge arm power module A is an AC port A of the power unit; a port 2 of the bridge arm power module B is an AC port B of the power module; and a port 2 of the bridge arm power module C is an AC port C of the power unit; the control unit is composed of a full-FPGA controller receiving control command words transmitted from the main controller through a high-speed communication interface. The control command words of the three-phase full-controlled bridge power module control unit of the modular combined wind power converter is composed of 11 bytes, wherein ID represents an identification code of the power unit; SYN is synchronous frame data; TSA represents a control cycle of the bridge arm power module A; DA represents a turn-on duty ratio of the bridge arm power module A; SA represents a phase shift angle of the bridge arm power module A; TSB represents a control cycle of the bridge arm power module B; DB represents a turn-on duty ratio of the bridge arm power module B; SB represents a phase shift angle of the bridge arm power module B; TSC represents a control cycle of the bridge arm power module C; DC represents a turn-on duty ratio of the bridge arm power module C; and SC represents a phase shift angle of the bridge arm power module C.

Figure 4:
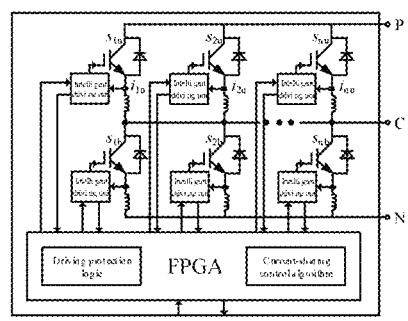
FIG. 4 is a diagram of a bridge arm power module of the modular combined wind power converter in accordance with the present invention.

As shown in FIG. 4, in accordance with the basic bridge arm power module of the modular combined wind power converter, the bridge arm power module is achieved by adopting a method of connecting a plurality of same bridge arm basic units in parallel, and the current-sharing control of the bridge arm basic units in parallel connection is achieved through a self-adaptive current-sharing control method. Wherein, the bridge arm power unit is formed by n same bridge arm basic units and the intelligent driving unit of the power device, currents and switch-on voltages of an upper switch tube and a lower switch tube are transmitted to a bridge arm module controller FPGA (field-programmable gate array) by each bridge arm, and an average current $i_{avg}$ according to the currents of various bridge arms is computed by the FPGA; when the current $i_{ci}$ of the i-th bridge arm is more than $i_{avg}$, a driving voltage corresponding to the tube is reduced, and when the current $i_{ci}$ of the i-th bridge arm is less than $i_{avg}$, the driving voltage corresponding to the tube is increased; and a computational formula of a driving voltage variation is:

$$\Delta U_{Gi} = K_{G1} K_{G2} (i_{avg} - i_{ci}) = K_{G1} K_{G2} \left( \frac{1}{n} \sum_{i=1}^{n} i_{ci} - i_{ci} \right)$$

wherein $K_{G1}$ is a coefficient of relationship of the driving voltage and saturation voltage drop of the power device; and $K_{G2}$ is a coefficient of relationship of the saturation voltage drop and a current of the power device.

Figure 5:
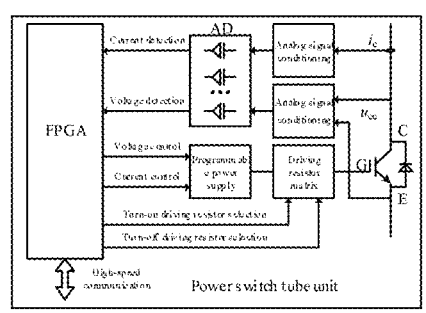
FIG. 5 is a diagram of an intelligent driving unit of a power device in accordance with the present invention.

As shown in FIG. 5, in accordance with a power device intelligent driving unit of the modular combined wind power converter, the FPGA controller of the power device intelligent driving unit receives a turn-on time instruction and a turn-off time instruction of a power tube through high-speed serial communication, and receives a switching signal of the power tube through a digital interface; the current $i_c$ and the tube voltage drop $U_{cc}$ of the power switch tube are accessed to the FPGA through an analog signal conditioning circuit and an AD converter; an output voltage and a current of a programmable power supply are determined according to a relational table of turn-on time and turn-off time with respect to the driving voltage and the current of the power switch tube respectively, and meanwhile, a driving resistor is selected to be turned on and turned off by controlling a driving resistor matrix, thus achieving accurate turn-on and turn-off of the power device. The turn-on time and the turn-off time of the power device are accurately computed by the intelligent driving unit, and are transmitted to the controller of the bridge arm power unit through the high-speed serial communication.

Figure 6:
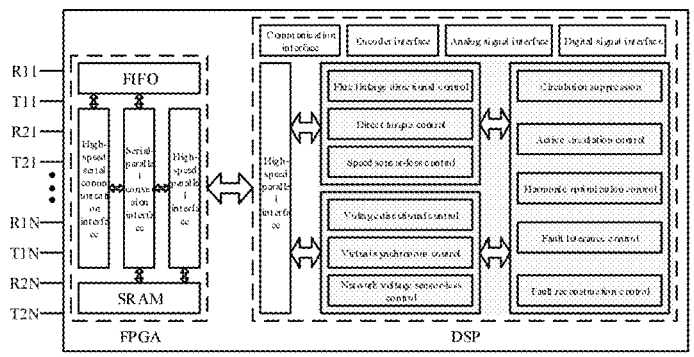
FIG. 6 is a diagram of a main controller unit of a modular combined wind power converter in accordance with the present invention.

As shown in FIG. 6, a main control unit of the modular combined wind power converter comprises a DSP (digital signal processor) module and FPGA module; the FPGA comprises a high-speed serial communication interface, a serial-parallel conversion interface, a high-speed parallel interface, a FIFO, and an SRAM; the high-speed serial communication interface is used for synchronously receiving basic information of 2N converter modules, temporarily storing the information in the FIFO under the control of a logic and control processing module, and further storing the information in the SRAM, and the information of a converter power circuit can be ultimately sent to the DSP module through the high-speed parallel interface; the DSP module comprises a high-speed parallel interface, a communication interface, an encoder interface, an analog signal interface, a digital signal interface, and a software function module, wherein the high-speed parallel interface is used for performing mass data high-speed communication with the FPGA module; the communication interface is used for performing real-time communication with a fan master control or other interface equipment; the encoder interface is used for being connected to a power generator to acquire rotational speed and angle information of the power generator; the analog signal interface is used for detecting a state of a power grid side accessed by the wind power converter and signals such as temperature, humidity and the like in a converter cabinet; and the digital signal interface is used for detecting state signals of other peripherals; the software function module comprises a low-level function module and a top-level function module; the low-level function module comprises a flux linkage directional control function module, a direct torque control function module, a speed sensorless function module, a voltage directional control function module, a virtual synchronous control function module and a network voltage sensor-less function module; the top-level function module comprises a circulation suppression function module, an active circulation control function module, a harmonic optimization control function module, a fault tolerance control function module, and a fault reconstruction control function module. A total of N receiving optical fiber terminals and N optical fiber transmitting terminals of the system power module are connected to control circuit optical fiber ports of N power modules of the wind power converter.

Figure 7:
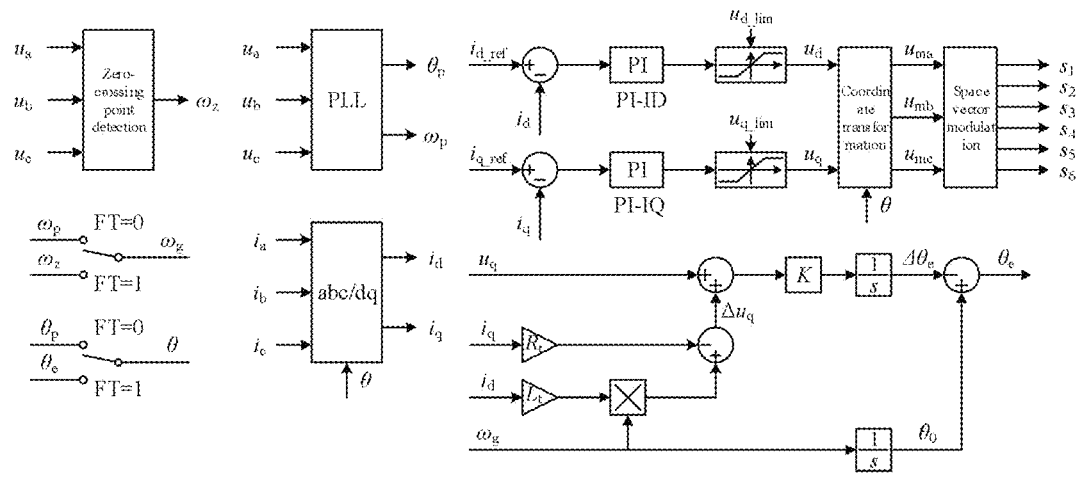
FIG. 7 is a diagram of a control unit of a basic converter unit in accordance with the present invention.

As shown in FIG. 7, in accordance with a basic converter module control unit of the modular combined wind power converter, a frequency $\omega_z$ is obtained from a three-phase voltage of the converter by a zero-crossing point detection circuit, and meanwhile, the three-phase voltage of the converter is input to a three-phase phase-locked loop (PLL) after being detected by a voltage sensor, thus obtaining an angle $\theta_p$ and a frequency $\omega_p$; a variable $\omega_g$, $\theta_g$ and a symbol FT are introduced, wherein $\omega_g$ represents a voltage angular frequency, $\theta_g$ represents a voltage phase angle, and the FT represents a state of the voltage sensor; when FT=0, a value of $\omega_g$ is $\omega_p$, and a value of $\theta_g$ is $\theta_p$; when FT=1, a value of $\omega_g$ is $\omega_z$, and a value of $\theta_g$ is $\theta_c$; a three-phase current of the converter is subjected to three-phase static to two-phase rotation coordinate transformation to obtain $i_d$ and $i_q$; a difference value between given currents $i_{d\_ref}$ and $i_{q\text{-}ref}$ and currents $i_d$ and $i_q$ is evaluated respectively to obtain $u_d$ and $u_q$ from the difference values by a PI regulator and then an amplitude limiting link, $u_d$ and the $u_q$ are subjected to the two-phase rotation to three-phase static coordinate transformation to obtain three-phase modulation wave voltages $u_{ma}$, $u_{mb}$ and $u_{mc}$, and a three-phase power module is driven by space vector modulation; $\Delta\theta_c$ is obtained from the sum of the voltage $u_q$ and coupling term $\Delta u_q$ thereof by a gain integrator; and the signal $\omega_g$ subtracts $\Delta\theta_e$ by the integrator to obtain $\theta_e$.

Figure 8:
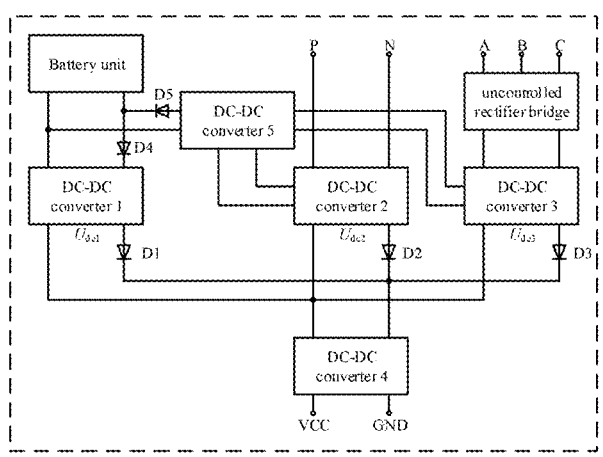
FIG. 8 is a diagram of a control power module of a modular combined wind power converter in accordance with the present invention.

As shown in FIG. 8, a control power module of the modular combined wind power converter is provided with three AC input ports and two DC input ports; the AC ports are used for connecting a three-phase AC voltage, and the DC ports are used for connecting a DC voltage; the three-phase AC voltage is connected to a DC-DC converter 3 after passing through a uncontrolled rectifier, the DC voltage is connected to a DC-DC converter 2, second outputs of the DC-DC converter 2 and the DC-DC converter 3 are connected to two input ports of a DC-DC converter 5, and output port of the DC-DC converter 5 charges a battery unit through a diode D5; an output of the battery unit is connected to an input of a DC-DC converter 1 through a diode D4, the DC-DC converter 1 outputs a stable DC voltage $U_{dc1}$, the DC-DC converter 2 outputs a stable DC voltage $U_{dc2}$, and the DC-DC converter 3 outputs a stable DC voltage $U_{dc3}$; an output of the DC-DC converter 1 is connected to an input of the DC-DC converter 4 through a diode D1, an output of the DC-DC converter 2 is connected to an input of a DC-DC converter 4 through a diode D2, an output of the DC-DC converter 3 is connected to an input of the DC-DC converter 4 through a diode D3, and the DC-DC converter outputs the stable DC voltage to supply power to the basic converter module.

Figure 9:
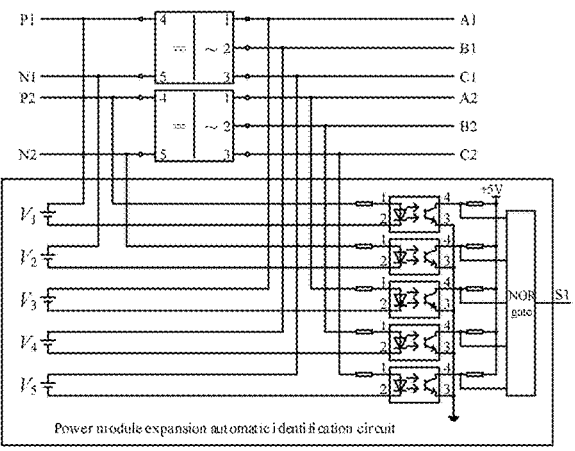
FIG. 9 is a diagram of an intelligent expansion automatic identification circuit of a power module in accordance with the present invention.

As shown in FIG. 9, the power module intelligent expansion automatic identification circuit of the modular combined wind power converter comprises power supplies, optocouplers, and logic gate circuits. Two power modules in parallel connection are taken as an example to indicate basic functions of the power module expansion automatic identification circuit, which can be specifically described as follows: a positive electrode of a power supply V1 is connected to a terminal 4 of the converter module 1, a terminal 4 of the converter module 2 is connected to a pin 1 of an optocoupler T1 through a resistor R11, and a pin 2 of the optocoupler T1 is connected to a negative electrode of the power supply V1; a positive electrode of a power supply V2 is connected to a terminal 5 of the converter module 1, a terminal 5 of the converter module 2 is connected to a pin 1 of an optocoupler T2 through a resistor R12, a pin 2 of the optocoupler T2 is connected to a negative electrode of the power supply V2; a positive electrode of a power supply V3 is connected to a terminal 1 of the converter module 1, a terminal 1 of the converter module 2 is connected to a pin 1 of an optocoupler T3 through a resistor R13, and a pin 2 of the optocoupler T3 is connected to a negative electrode of the power supply V3; a positive electrode of a power supply V4 is connected to a terminal 2 of the converter module 1, a terminal 2 of the converter module 2 is connected to a pin 1 of an optocoupler T4 through a resistor R14, and a pin 2 of the optocoupler T4 is connected to a negative electrode of the power supply V4; a positive electrode of a power supply V5 is connected to a terminal 3 of the converter module 1, a terminal 3 of the converter module 2 is connected to a pin 1 of an optocoupler T5 through a resistor R15, and a pin 2 of the optocoupler T5 is connected to a negative electrode of the power supply V5; a +5V power supply is connected to a pin 4 of the optocoupler T1 through a resistor R21, the +5V power supply is connected to a pin 4 of the optocoupler T2 through a resistor R22, the +5V power supply is connected to a pin 4 of the optocoupler T3 through a resistor R23, the +5V power supply is connected to a pin 4 of the optocoupler T4 through a resistor R24, and the +5V power supply is connected to a pin 4 of the optocoupler T5 through a resistor R25; pins 3 of the optocoupler T1 to the optocoupler T5 are connected to the +5V power supply ground, and pins 4 of the optocoupler T1 to the optocoupler T5 are connected to an input NOR gate 5; when the output S1 of the NOR gate is at a high level, judging that the converter module 2 is accessed to a converter system, and allowing the converter module 2 to work; and when the output S1 of the NOR gate is at a low level, judging that the converter module 2 exits from the converter system, and forbidding the converter module 2 to work.

Figure 10:
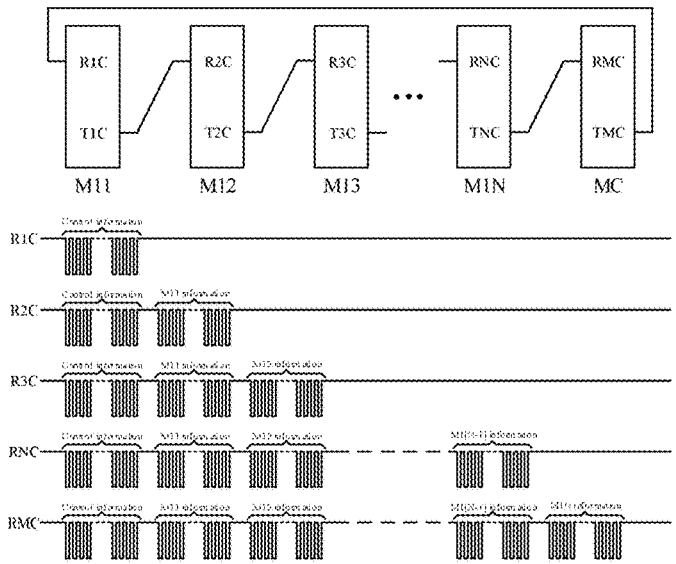
FIG. 10 is a diagram of an information interaction technology of a modular combined wind power converter in accordance with the present invention.

As shown in FIG. 10, in accordance with a serial data link communication technology of the modular combined wind power converter, a transmitting port of the main controller is connected to a receiving port R1C of the M11, a transmitting port T1C of the M11 is connected to a receiving port R2C of the M12, a transmitting port T2C of the M12 is connected to a receiving port R3C of the M13, and so on, a transmitting port T[N-1]C of the M1[N-1] is connected to a receiving port RNC of the M1N, and a transmitting port TNC of the M1N is connected to a receiving port RMC of the main controller; the main controller transmits control information to the M11 through the TMC port, the M11 synchronously transmits the control information data out from the T1C port while receiving the control information data, and state information of the M11 is transmitted out from the T1C after the control information data is completely received; the M12 synchronously transmits the control information data out from the T2C port while receiving the control information, and state information of the M12 is transmitted out from the T2C port after the control information and the M11 state information are completely received, and so on; the M1N transmits the control information data out from the TNC port while receiving the control information, and the state information of the M1N is transmitted out from the TNC port after the control information and the M1[N-1] state information are completely received; and the main controller may receive state information of all power modules at the RMC port.

Figure 11:
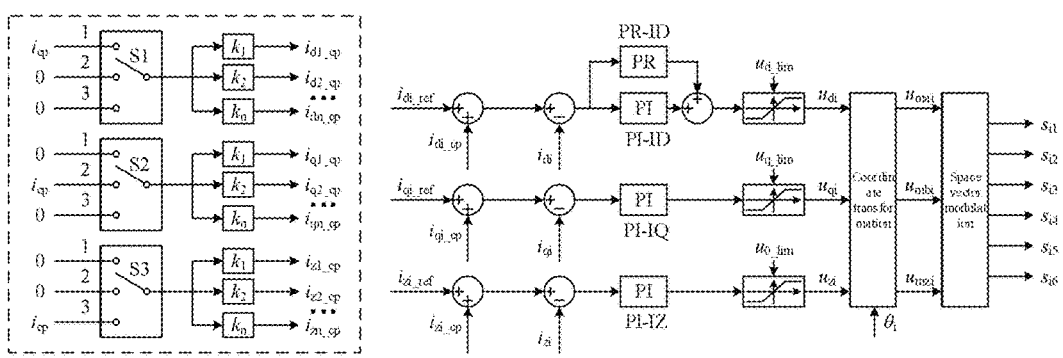
FIG. 11 is a diagram of an active circulation control method of a modular combined wind power converter in accordance with the present invention.

As shown in FIG. 11, a method of the modular combined wind power converter for achieving thermal balance of the converter by using a multi-mode active circulation control is as follows, the system having three operating modes:

mode 1: a positive-sequence active circulation control mode, wherein multiple switches S1, S2 and S3 are all located at a position 1, in the modular combined converter, a positive-sequence circulating current with an amplitude $i_{cp}$ flows in the converters, an additional component $i_{di\_cp}$ is added to a d-axis reference current of each converter, an expression thereof satisfying:

$$\begin{cases} i_{cp} = \sum_{i=1}^{m} k_i \cdot i_{di\_cp} \\ i_{cp} = -\sum_{i=m}^{n} k_i \cdot i_{di\_cp} \\ i_{qi\_cp} = i_{zi\_cp} = 0 \end{cases}$$

mode 2: a negative-sequence active circulation control mode, wherein multiple switches S1, S2 and S3 are all located at the position 1, in the modular combined converter under the mode, a negative-sequence circulating current with an amplitude $i_{cp}$ flows in the converters, and an additional component $i_{di\_cp}$ is added in the d-axis reference current of each converter, an expression thereof satisfying:

$$\begin{cases} i_{cp} = \sum_{i=1}^{m} k_i \cdot i_{di\_cpm} \\ i_{cp} = -\sum_{i=m}^{n} k_i \cdot i_{di\_cpm} \\ i_{di\_cp} = i_{di\_cpm} \cos(2\omega t + \phi), i_{qi\_cp} = i_{zi\_cp} = 0 \end{cases}$$

mode 3: a reactive active circulation control mode, wherein multiple switches S1, S2 and S3 are all located at a position 2, in the modular combined converter under the mode, a reactive circulating current with an amplitude $i_{cp}$ flows in the converters, and an additional component $i_{q1\_cp}$ is added in the d-axis reference current of each converter, an expression thereof satisfying:

$$\begin{cases} i_{cp} = \sum_{i=1}^{m} k_i \cdot i_{qi} \\ i_{cp} = -\sum_{i=m}^{n} k_i \cdot i_{qi} \\ i_{di\_cp} = i_{zi\_cp} = 0 \end{cases}$$

and mode 4: a zero-sequence active circulation control mode, wherein multiple switches S1, S2 and S3 are all located at a position 3, in the modular combined converter under the mode, a zero-sequence circulating current with an amplitude $i_{cp}$ flows in the converters, and an additional component $i_{zi\_cp}$ is added in the d-axis reference current of each converter, an expression thereof satisfying:

$$\begin{cases} i_{cp} = \sum_{i=1}^{m} k_i \cdot i_{zi} \\ i_{cp} = -\sum_{i=m}^{n} k_i \cdot i_{zi} \\ i_{di\_cp} = i_{qi\_cp} = 0 \end{cases}$$

Figure 12:
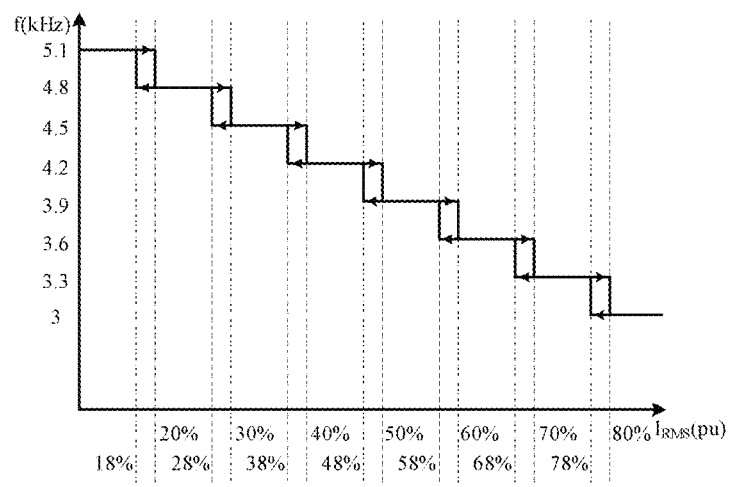
FIG. 12 is diagram of a harmonic optimization control method of a modular combined wind power converter in accordance with the present invention.

Referring to FIG. 12, a harmonic optimization control method of the modular combined wind power converter comprises equally dividing the output power of the wind power converter from 0.2-1 pu in accordance with a step length of 0.2 pu, when the output power of the converter is in a state of 0-0.2 pu, selecting the switching frequency to be 5.1 KHz, and reducing the switching frequency by 0.3 KHz every time the power is increased by 0.2 pu. In contrast, to avoid frequent switching of the switching frequency between the working conditions of the converter, when the converter is reduced to 0.78 pu from the rated working condition, the switching frequency is increased by 0.3 KHz, thus forming the power-frequency hysteresis of 0.02 pu, and so on as the power is reduced. A specific implementation method of the harmonic optical control of the modular combined wind power converter comprises: detecting the magnitude of the grid-connected current, and computing an effective value thereof; judging a change direction of the grid-connected power of the wind power converter, checking a corresponding table of the current and the switching frequency according to a change method of the grid-connected power of the wind power converter, reading a switching frequency value stored in a memory in advance, and sending the switching frequency value back to a PWM generator to achieve the variable switching frequency control, thus achieving variable switching frequency control of the wind power converter.

Figure 13:
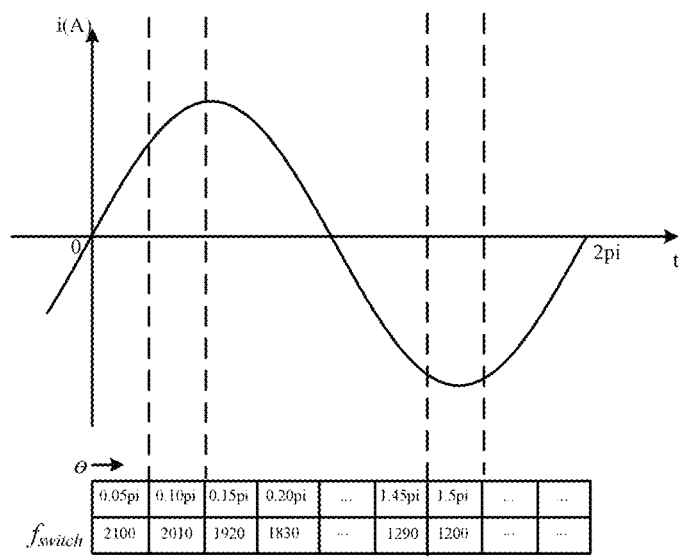
FIG. 13 is a diagram of a thermal stress balance control method in accordance with the present invention.

Referring to FIG. 13, a converter thermal stress balance control method of the modular combined wind power converter comprises: taking the converter switching frequency of 2 kHz as an example, dividing the grid-connected current into 40 equal parts in one period according to the phase; when the phase is in the interval of 0-0.05 pi, selecting the switching frequency to be 2450 Hz, then reducing the switching frequency by 90 Hz every 0.05 π angle until reaching the current peak value at 0.5 π, and changing the switching frequency into 1550 Hz; when the phase is in an internal of 0.5 π to π, starting the switching frequency from 1550 Hz, increasing the switching frequency by 90 Hz every 0.05 π angle until the angle is equal to π, and changing the switching frequency into 2450 Hz; when the phase is in the interval of π to 1.05 π, selecting the switching frequency to be 2450 Hz, then reducing the switching frequency by 90 Hz every 0.05 π angle until reaching the current peak value at 1.5 π, and changing the switching frequency into 1550 Hz; when the phase is in the interval of 1.5 π to 2 π, starting the switching frequency starts from 1550 Hz, and increasing by 90 Hz every 0.05 π angle until the angle is equal to 2 π, and changing the switching frequency into 2450 Hz; in the next current cycle, repeating the change of the switching frequency according to the above rule. A specific implementation method of the converter thermal stress balance control of the modular combined wind power converter comprises: firstly, detecting the magnitude of the grid-connected current, and detecting a phase angle thereof, looking up a corresponding data table of the phase angle and the switching frequency according to the detected phase angle, and then reading the switching frequency value stored in a memory in advance, and sending the switching frequency value back to the PWM generator, thus achieving variable switching frequency control in on current cyclic wave.

Figure 14:
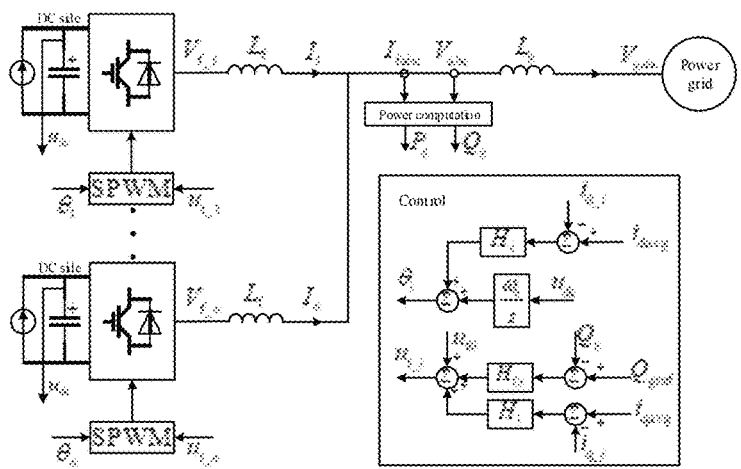
FIG. 14 is a diagram of a parallel current-sharing control method of power source control in accordance with the present invention.

Referring to FIG. 14, a parallel current-sharing control method of the modular combined wind power generator comprises: computing reactive power of a grid-connected side according to a three-phase grid-connected voltage and current of a grid-side converter module 1; obtaining $\Delta u_{t1}$ from a difference value between the given reactive power and the actual reactive power by a PI regulator; obtaining a reference value of an angle from a DC voltage by a proportional integrator; performing Park transformation on a three-phase current to obtain $i_{d1}$ and $i_{q1}$, further obtaining an average current of n grid-side converters as:

$$\begin{cases} i_{davg} = \sum_{i=1}^{n} i_{di} \\ i_{qavg} = \sum_{i=1}^{n} i_{qi} \end{cases}$$

obtaining $\Delta\theta$ from a difference value between the average current $i_{davg}$ and sum of $i_{d1}$ by the PI regulator; obtaining $\Delta u_t$ from a difference value between the average current $i_{qavg}$ and sum of $i_{g1}$ by the PI regulator, and then respectively obtaining a phase and an amplitude of a modulation wave as:

$$\begin{cases} \theta = \frac{\omega_0}{s} u_{dc} + \left(K_{ip} + \frac{K_{ii}}{s}\right)\left(\sum_{i=1}^{n} i_{di} - i_{d1}\right) \\ u_t = u_{t0} + \left(K_{Qp} + \frac{K_{Qi}}{s}\right)(Q_{gref} - Q_g) \end{cases}$$

and obtaining a three-phase modulation wave according to the phase angle and the magnitude of the modulation wave, and driving the grid-side converters through PWM modulation.

Figure 15:
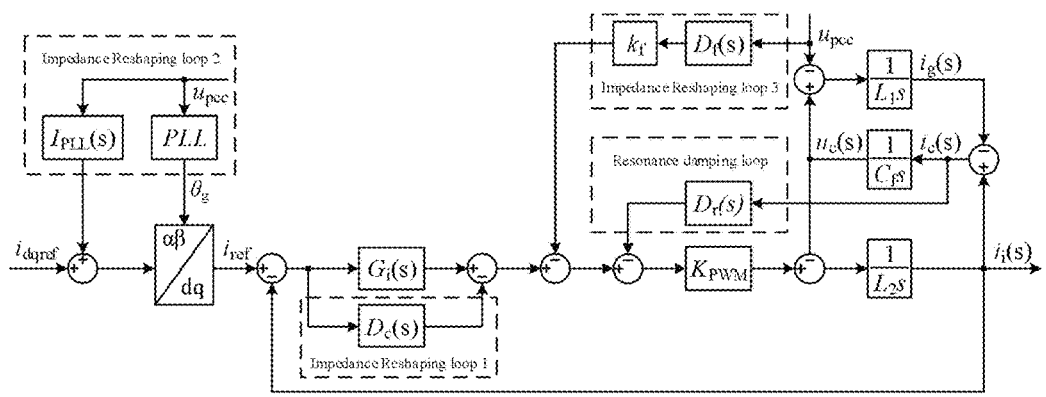
FIG. 15 is a diagram of converter stable control of a modular combined wind power converter in accordance with the present invention.
Figure 16:
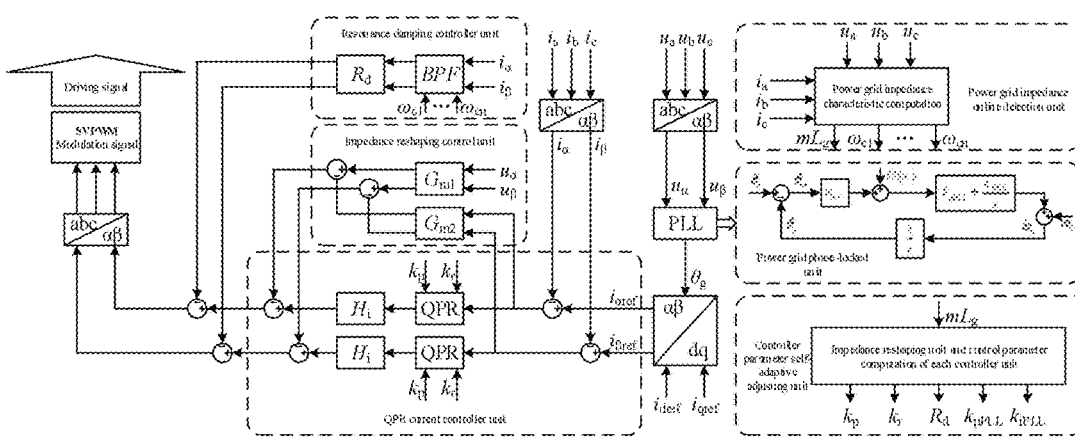
FIG. 16 is a diagram of power grid impedance self-adaptive control in accordance with the present invention.

Referring to FIG. 15, a converter port impedance reshaping control method of the modular combined wind power generator comprises: adjusting equivalent impedance of a grid-connected side converter of the wind power converter in different frequency bands or the phase angle margin at the corresponding frequency band by arranging different impedance reshaping loops in different links of a current loop, and then improving the grid-connected stability of the wind power converter, the specific implementation being as follows: feeding back a current error to an output of the current loop through a control link Dc(s) to form an impedance reshaping loop 1; adding a grid-connected point voltage to a given reference value of the current loop through $I_{PLL}(s)$ to form an impedance reshaping loop 2; and adding the grid-connected point voltage to a control output of the current loop through $D_f(s)$ and multiplied by the gain Kf to form an impedance reshaping loop 3. Referring to FIG. 16, a power grid impedance self-adaptive control method of the modular combined wind power converter comprises achieving the current loop self-adaptive control of the grid-connected side converter of the wind power converter through on-line detection of the power grid impedance.

It should be recognized that the embodiments of the present invention may be achieved or implemented by computer hardware, a combination of hardware and software, or computer instructions stored in a non-transitory computer readable memory. The method may be implemented in a computer program using standard programming techniques-including a non-transitory computer-readable storage medium configured with the computer program, where the storage medium in such configuration makes a computer operate in a particular and predefined manner-according to the methods and accompanying drawings described in the specific embodiments. Each program may be implemented in a high-level procedural or object-oriented programming language to communicate with a computer system. However, if needed, the program may be implemented in an assembly language or machine language. In any case, the language may be compiled or interpreted language. In addition, to this end, the program may be run on a programmed application specific integrated circuit.

In addition, operations of the processes described herein may be executed in any suitable order unless otherwise indicated herein or otherwise clearly contradicted by context. The processes (or variations and/or combinations thereof) described herein may be executed under the control of one or more computer systems configured with executable instructions, and may be implemented as code (e.g., executable instructions, one or more computer programs, or one or more applications) co-executed on one or more processors, by hardware, or combinations thereof. The computer program comprises multiple instruction capable of being executed by one or more processors.

Further, the method may be implemented in any type of computing platform operably connected to a suitable computing platform, including, but not limited to, a personal computer, a minicomputer, a mainframe, a workstation, a network or distributed computing environment, a standalone or integrated computer platform, or in communication with a charged particle tool or other imaging apparatus, or the like. Aspects of the present invention can be implemented by machine-readable codes stored on non-transitory storage media or devices, whether removable or integrated into computing platforms, such as hard disks, optical reading and/or write-in of storage media, RAM, ROM, etc., they may be read by a programmable computer, and when the storage medium or device is read by the computer, they can be used to configure and operate the computer to perform the processes described herein. In addition, the machine readable code, or portions thereof, may be transmitted over a wired or wireless network. These and other different types of non-transitory computer-readable storage media are encompassed by the invention described herein when such media comprise instructions or programs to implement the steps described above in conjunction with a microprocessor or other data processor. When programming according to the methods and techniques described in the present invention, the present invention also includes the computer itself. The computer program can be applied to inputting data to execute the functions described herein, thus converting input data to generate output data stored to a non-volatile memory. Output information may be further applied to one or more output devices, such as displays. In preferred embodiments of the present invention, converted data represents physical and tangible objects, including particular visual depictions of the physical and tangible objects produced on the display.

As used in present application, the terms "component", "module", "system", etc. are intended to refer to a computer-related entity, which can be hardware, firmware, a combination of hardware and software, software, or software in running. For example, a component may be, but is not limited to: a process running on a processor, a processor, an object, an executable file, a thread in execution, a program, and/or a computer. As an example, both the application running on the computing device and the computing device may be components. One or more components may exist in a process and/or thread in execution, and the components may be located in one computer and/or distributed between two or more computers. In addition, these components can be executed from various computer-readable media having various data structures thereon. These components can communicate in a local and/or remote process, such as based on a signal having one or more data packets (e.g., data from one component, the component is interacted with another component in a local system, a distributed system and/or is interacted with other system through a network such an Internet in a signal way).

It should be noted that above embodiments are only used to illustrate the technical solution of the present invention rather than limiting. Although the present invention has been described in detail with reference to the preferred embodiments, it should be understood by those of ordinary skill in the art that modifications or equivalent substitutions may be made to the technical solutions of the present invention without departing from the spirit and scope of the technical scheme of the present invention, all of which should be encompassed by the scope of claims of the present invention.

The invention claimed is:

1. A modular intelligent combined wind power converter, comprising:
a plurality of bridge arm power units, wherein the plurality of the bridge arm power units is connected in parallel to form bridge arm power modules having a high-capacity, three of the bridge arm power modules form a three-phase full-controlled bridge power module, the three-phase full-controlled bridge power module comprises an electric reactor, a capacitor, a fuse, and a circuit breaker to form a basic converter module, and the basic converter module forms the modular intelligent combined wind power converter through a modular intelligent combination method;
wherein
the modular intelligent combined wind power converter can control accurate turn-on and turn-off of a bridge arm power switch through an intelligent driving unit of a power device, and a current-sharing controller is integrated in each of the bridge arm power modules for achieving current sharing of each of bridge arms in the bridge arm power modules;
a driving controller is integrated in the three-phase full-controlled bridge power module for achieving different switch combinations of the three bridge arm power modules; the basic converter module is integrated with a converter main controller for controlling an output current of a converter, and intelligent identification and on-line hot plugging of a converter power unit can be achieved through a converter modular intelligent combination method; the converter main controller comprises a main control unit used for achieving basic control of grid connection and a wind driven generator; the main control unit comprises an active circulation control module, a grid-connected current harmonic optimization control module, a converter thermal stress balance control module, a parallel current-sharing control module, a converter stability control module, and a power grid impedance self-adaptive control module;
wherein current control is achieved by a control unit in each basic converter module, a power module expansion automatic identification circuit is used for identifying whether a basic power module is accessed or not and achieving an on-line hot plugging function of the basic power module through the converter main controller of the wind power converter, and a control power module takes power from an alternating-current (AC) terminal and a direct-current (DC) terminal to supply power to a control circuit;
wherein the three-phase full-controlled bridge power module comprises a power unit and a control unit, wherein
the power unit comprises three same bridge arm power modules, a port 1 of a bridge arm power module A, a port 1 of a bridge arm power module B and a port 1 of a bridge arm power module C are connected together to form a DC port P of the power unit; a port 3 of the bridge arm power module A, a port 3 of the bridge arm power module B and a port 3 of the bridge arm power module C are connected together to form a DC port N of the power unit; a port 2 of the bridge arm power module A is an AC port A of the power unit; a port 2 of the bridge arm power module B is an AC port B of the power module; and a port 2 of the bridge arm power module C is an AC port C of the power unit;
wherein the main control unit comprises
a full FPGA controller receiving control command words sent from the converter main controller through a high-speed communication interface, and a format of the control command words being as follows:

| ID | SYN | TSA | DA | SA | TSB | DB | SB | TSC | DC | SC |
|----|-----|-----|----|----|-----|----|----|-----|----|----| wherein ID represents an identification code of the power unit; SYN is synchronous frame data; TSA represents a control cycle of the bridge arm power module A; DA represents a turn-on duty ratio of the bridge arm power module A; SA represents a phase shift angle of the bridge arm power module A; TSB represents a control cycle of the bridge arm power module B; DB represents a turn-on duty ratio of the bridge arm power module B; SB represents a phase shift angle of the bridge arm power module B; TSC represents a control cycle of the bridge arm power module C;

DC represents a turn-on duty ratio of the bridge arm power module C; and SC represents a phase shift angle of the bridge arm power module C;

wherein the plurality of bridge arm power units comprises achieving bridge arm power modules by connecting at least one bridge arm power unit in parallel, and a current-sharing control of bridge arm basic units in parallel connection is achieved through self-adaptive current-sharing control, the control being as follows:

forming the at least one bridge arm power unit by n same bridge arm basic units and the intelligent driving unit of the power device, sending, by each of the bridge arms, currents and switch-on voltages of an upper switch tube and a lower switch tube to a bridge arm module controller FPGA (field-programmable gate array), and computing, by the bridge arm module controller FPGA, an average current $i_{avg}$ according to currents of the bridge arms;

when a current $i_{ci}$ of an i-th bridge arm is more than $i_{avg}$, reducing a driving voltage corresponding to the upper switch tube and the lower switch tube, and when the current $i_{ci}$ of the i-th bridge arm is less than $i_{avg}$, increasing the driving voltage corresponding to the upper switch tube and the lower switch tube, wherein a computational formula of a driving voltage variation is:

$$\Delta U_{Gi} = K_{G1} K_{G2} (i_{avg} - i_{ci}) = K_{G1} K_{G2} \left( \frac{1}{n} \sum_{i=1}^{n} i_{ci} - i_{ci} \right)$$

wherein $K_{G1}$ is a coefficient of relationship of the driving voltage and a saturation voltage drop of the power device; and $K_{G2}$ is a coefficient of relationship of the saturation voltage drop and a current of the power device;

wherein the intelligent driving unit comprises achieving accurate turn-on and turn-off of the power device by adopting an intelligent driving control method, which is implemented as follows:

receiving, by the full FPGA controller in the intelligent driving unit of the power device, a turn-on time instruction and a turn-off time instruction of a power tube through a high-speed serial communication;

receiving a switching signal of the power tube through a digital interface, wherein a current $i_c$ and tube voltage drop $U_{cc}$ of the power switch tube are accessed to the FPGA through an analog signal conditioning circuit and an AD (Analog-Digital) converter;

according to a relational table of turn-on time and turn-off time with respect to the driving voltage and the current of the power switch tube respectively, determining an output voltage and a current of a programmable power supply, and selecting to turn on and turn off a driving resistor by controlling a driving resistor matrix, thus achieving accurate turn-on and turn-off of the power device; and determining, by the intelligent driving unit, the turn-on time and the turn-off time of the power device, and transmitting the turn-on time and the turn-off time to a controller of the bridge arm power units through the high-speed serial communication.

2. The modular intelligent combined wind power converter according to claim 1, wherein the modular intelligent combination method adopted by the wind power converter comprises constructing a modular combination capacity-expanded converter system architecture, wherein a circuit structure of the modular combination capacity-expanded converter system architecture is implemented as follows:

connecting a terminal 4 of a basic converter module M1N to a terminal 4 of a basic converter module M2N, and connecting a terminal 5 of the basic converter module M1N to a terminal 5 of the basic converter module M2N;

connecting a terminal 1 of a basic converter module M1[N-1] to a terminal 1 of the basic converter module M1N, connecting a terminal 2 of the basic converter module M1[N-1] to a terminal 2 of the basic converter module M1N, and connecting a terminal 3 of the basic converter module M1[N-1] to a terminal 3 of the basic converter module M1N;

connecting a terminal 1 of a basic converter module M2[N-1] to a terminal 1 of the basic converter module M2N, connecting a terminal 2 of the basic converter module M2[N-1] to a terminal 2 of the basic converter module M2N, and connecting a terminal 3 of the basic converter module M2[N-1] to a terminal 3 of the basic converter module M2N;

and each of the basic converter modules is provided with a receiving optical fiber RX and a transmitting optical fiber TX, which can be connected to the main control unit of the converter main controller through different ways.

3. The modular intelligent combined wind power converter according to claim 1, wherein determining the turn-on time and the turn-off time of the power device comprises:

transmitting, by the controller of the bridge arm power units, a driving voltage, a driving current, and a turn-on driving resistor setting value as well as a turn-off driving resistor setting value to the controller of the intelligent driving unit of the power device;

transmitting, by the controller of the bridge arm power units, driving test signals to the controller of the intelligent driving unit of the power device at intervals;

controlling, by the controller of the intelligent driving unit, the power device to be switched on at intervals, and sequentially detecting the turn-on time and the turn-off time of the power device per time;

transmitting, by the controller of the intelligent driving unit, the turn-on time and the turn-off time of the power device to the controller of the bridge arm power modules; and computing, by the controller of the bridge arm power units, an average value of the turn-on time and the turn-off time of all bridge arm power devices in parallel connection as the turn-on time instruction and the turn-off time instruction of the power tube.

4. The modular intelligent combined wind power converter according to claim 1, wherein the main control unit comprises a DSP (digital signal processor) module and an FPGA module;

the FPGA module comprises a high-speed serial communication interface, a serial-parallel conversion interface, a high-speed parallel interface, a FIFO (First In, First Out), and an SRAM (Static Random Access Memory); the high-speed serial communication interface is used for synchronously receiving basic information of 2N converter modules, temporarily storing the information in the FIFO under the control of a logic and control processing module, and further storing the information in the SRAM, and the information of a converter power circuit can be sent to the DSP module through the high-speed parallel interface; and the DSP module comprises a high-speed parallel interface, a communication interface, an encoder interface, an analog signal interface, a digital signal interface, and a software function module, wherein the high-speed parallel interface is used for performing mass data high-speed communication with the FPGA module; the communication interface is used for performing real-time communication with a fan master control or other interface equipment; the encoder interface is used for being connected to a power generator to acquire rotational speed and angle information of the power generator; the analog signal interface is used for detecting a state of a power grid side accessed by the wind power converter and signals such as temperature, humidity and the like in a converter cabinet; and the digital signal interface is used for detecting state signals of other peripherals.

5. The modular intelligent combined wind power converter according to claim 2, wherein the main control unit comprises a DSP (digital signal processor) module and an FPGA module;

the FPGA module comprises a high-speed serial communication interface, a serial-parallel conversion interface, a high-speed parallel interface, a FIFO (First In, First Out), and an SRAM (Static Random Access Memory); the high-speed serial communication interface is used for synchronously receiving basic information of 2N converter modules, temporarily storing the information in the FIFO under the control of a logic and control processing module, and further storing the information in the SRAM, and the information of a converter power circuit can be sent to the DSP module through the high-speed parallel interface; and the DSP module comprises a high-speed parallel interface, a communication interface, an encoder interface, an analog signal interface, a digital signal interface, and a software function module, wherein the high-speed parallel interface is used for performing mass data high-speed communication with the FPGA module; the communication interface is used for performing real-time communication with a fan master control or other interface equipment; the encoder interface is used for being connected to a power generator to acquire rotational speed and angle information of the power generator; the analog signal interface is used for detecting a state of a power grid side accessed by the wind power converter and signals such as temperature, humidity and the like in a converter cabinet; and the digital signal interface is used for detecting state signals of other peripherals.

6. The modular intelligent combined wind power converter according to claim 3, wherein the main control unit comprises a DSP (digital signal processor) module and an FPGA module;

the FPGA module comprises a high-speed serial communication interface, a serial-parallel conversion interface, a high-speed parallel interface, a FIFO (First In, First Out), and an SRAM (Static Random Access Memory); the high-speed serial communication interface is used for synchronously receiving basic information of 2N converter modules, temporarily storing the information in the FIFO under the control of a logic and control processing module, and further storing the information in the SRAM, and the information of a converter power circuit can be sent to the DSP module through the high-speed parallel interface; and the DSP module comprises a high-speed parallel interface, a communication interface, an encoder interface, an analog signal interface, a digital signal interface, and a software function module, wherein the high-speed parallel interface is used for performing mass data high-speed communication with the FPGA module; the communication interface is used for performing real-time communication with a fan master control or other interface equipment; the encoder interface is used for being connected to a power generator to acquire rotational speed and angle information of the power generator; the analog signal interface is used for detecting a state of a power grid side accessed by the wind power converter and signals such as temperature, humidity and the like in a converter cabinet; and the digital signal interface is used for detecting state signals of other peripherals.

7. The modular intelligent combined wind power converter according to claim 4, wherein the control unit of each basic converter module is used for controlling an output current of the basic converter, with a control structure comprising:

obtaining a frequency $\omega_z$ from a three-phase voltage of the basic converter by a zero-crossing point detection circuit, and meanwhile, inputting the three-phase voltage of the basic converter to a three-phase phase-locked loop (PLL) after being detected by a voltage sensor, thus obtaining an angle $\theta_p$ and a frequency $\omega_p$;

introducing a variable $\omega_g$, $\theta_g$ and a symbol FT, wherein $\omega_g$ represents a voltage angular frequency, $\theta_g$ represents a voltage phase angle, and the FT represents a state of the voltage sensor;

when FT=0, a value of $\omega_g$ being $\omega_p$, and a value of $\theta_g$ being $\theta_p$;

when FT=1, a value of $\omega_g$ being $\omega_z$, and a value of $\theta_g$ being $\theta_c$;

performing a three-phase static to two-phase rotation coordinate transformation on a three-phase current of the basic converter to obtain $i_d$ and $i_q$;

evaluating a difference value between given currents $i_{d\_ref}$ and $i_{q\_ref}$ and currents $i_d$ and $i_q$ respectively, then obtaining $u_d$ and $u_q$ from difference values therefrom by a PI regulator and then an amplitude limiting link, performing two-phase rotation to three-phase static coordinate transformation on the $u_d$ and the $u_q$ to obtain three-phase modulation wave voltages $u_{ma}$, $u_{mb}$ and $u_{me}$, and driving a three-phase power module by space vector modulation;

obtaining $\Delta\theta_e$ from a sum of the voltage $u_q$ and coupling term $\Delta u_q$ thereof by a gain integrator; and subtracting $\Delta\theta_e$ from the signal $\omega_g$ by an integrator to obtain $\theta_e$.

8. The modular intelligent combined wind power converter according to claim 5, wherein the control unit of each basic converter module is used for controlling an output current of the basic converter, with a control structure comprising:

obtaining a frequency $\omega_z$ from a three-phase voltage of the basic converter by a zero-crossing point detection circuit, and meanwhile, inputting the three-phase voltage of the basic converter to a three-phase phase-locked loop (PLL) after being detected by a voltage sensor, thus obtaining an angle $\theta_p$ and a frequency $\omega_p$;

introducing a variable $\omega_g$, $\theta_g$ and a symbol FT, wherein $\omega_g$ represents a voltage angular frequency, $\theta_g$ represents a voltage phase angle, and the FT represents a state of the voltage sensor;

when FT=0, a value of $\omega_g$ being $\omega_p$, and a value of $\theta_g$ being $\theta_p$;

when FT=1, a value of $\omega_g$ being $\omega_z$, and a value of $\theta_g$ being $\theta_c$;

performing a three-phase static to two-phase rotation coordinate transformation on a three-phase current of the basic converter to obtain $i_d$ and $i_q$;

evaluating a difference value between given currents $i_{d\_ref}$ and $i_{q-ref}$ and currents $i_d$ and $i_q$ respectively, then obtaining $u_d$ and $u_q$ from difference values therefrom by a PI regulator and then an amplitude limiting link, performing two-phase rotation to three-phase static coordinate transformation on the $u_d$ and the $u_q$ to obtain three-phase modulation wave voltages $u_{ma}$, $u_{mb}$ and $u_{mc}$, and driving a three-phase power module by space vector modulation;

obtaining $\Delta\theta_e$ from a sum of the voltage $u_q$ and coupling term $\Delta u_q$ thereof by a gain integrator; and subtracting $\Delta\theta_e$ from the signal $\omega_g$ by an integrator to obtain $\theta_e$.

9. The modular intelligent combined wind power converter according to claim 6, wherein a control unit of each basic converter module is used for controlling an output current of the basic converter, with a control structure comprising:

obtaining a frequency $\omega_z$ from a three-phase voltage of the basic converter by a zero-crossing point detection circuit, and meanwhile, inputting the three-phase voltage of the basic converter to a three-phase phase-locked loop (PLL) after being detected by a voltage sensor, thus obtaining an angle $\theta_p$ and a frequency $\omega_p$;

introducing a variable $\omega_g$, $\theta_g$ and a symbol FT, wherein $\omega_g$ represents a voltage angular frequency, $\theta_g$ represents a voltage phase angle, and the FT represents a state of the voltage sensor;

when FT=0, a value of $\omega_g$ being $\omega_p$, and a value of $\theta_g$ being $\theta_p$;

when FT=1, a value of $\omega_g$ being $\omega_z$, and a value of $\theta_g$ being $\theta_c$;

performing a three-phase static to two-phase rotation coordinate transformation on a three-phase current of the basic converter to obtain $i_d$ and $i_q$;

evaluating a difference value between given currents $i_{d\_ref}$ and $i_{q-ref}$ and currents $i_d$ and $i_q$ respectively, then obtaining $u_d$ and $u_q$ from difference values therefrom by a PI regulator and then an amplitude limiting link, performing two-phase rotation to three-phase static coordinate transformation on the $u_d$ and the $u_q$ to obtain three-phase modulation wave voltages $u_{ma}$, $u_{mb}$ and $u_{mc}$, and driving a three-phase power module by space vector modulation;

obtaining $\Delta\theta_e$ from a sum of the voltage $u_q$ and coupling term $\Delta u_q$ thereof by a gain integrator; and subtracting $\Delta\theta_e$ from the signal $\omega_g$ by an integrator to obtain $\theta_e$.

10. The modular intelligent combined wind power converter according to claim 7, wherein the control power module comprises that:

a control power supply is provided with three AC input ports and two DC input ports; the AC input ports are used for connecting a three-phase AC voltage, and the DC input ports are used for connecting a DC voltage; the three-phase AC voltage is connected to a DC-DC converter 3 after passing through a uncontrolled rectifier, the DC voltage is connected to a DC-DC converter 2, second outputs of the DC-DC converter 2 and the DC-DC converter 3 are connected to two input ports of a DC-DC converter 5, and output port of the DC-DC converter 5 charges a battery unit through a diode D5; and an output of the battery unit is connected to an input of a DC-DC converter 1 through a diode D4, the DC-DC converter 1 outputs a stable DC voltage Udc1, the DC-DC converter 2 outputs a stable DC voltage Udc2, and the DC-DC converter 3 outputs a stable DC voltage Udc3; an output of the DC-DC converter 1 is connected to an input of the DC-DC converter 4 through a diode D1, an output of the DC-DC converter 2 is connected to an input of a DC-DC converter 4 through a diode D2, an output of the DC-DC converter 3 is connected to an input of the DC-DC converter 4 through a diode D3, and the DC-DC converter outputs the stable DC voltage to supply power to the basic converter module.

11. The modular intelligent combined wind power converter according to claim 8, wherein the control power module comprises that:

a control power supply is provided with three AC input ports and two DC input ports; the AC input ports are used for connecting a three-phase AC voltage, and the DC input ports are used for connecting a DC voltage; the three-phase AC voltage is connected to a DC-DC converter 3 after passing through a uncontrolled rectifier, the DC voltage is connected to a DC-DC converter 2, second outputs of the DC-DC converter 2 and the DC-DC converter 3 are connected to two input ports of a DC-DC converter 5, and output port of the DC-DC converter 5 charges a battery unit through a diode D5; and an output of the battery unit is connected to an input of a DC-DC converter 1 through a diode D4, the DC-DC converter 1 outputs a stable DC voltage Udc1, the DC-DC converter 2 outputs a stable DC voltage Udc2, and the DC-DC converter 3 outputs a stable DC voltage Udc3; an output of the DC-DC converter 1 is connected to an input of the DC-DC converter 4 through a diode D1, an output of the DC-DC converter 2 is connected to an input of a DC-DC converter 4 through a diode D2, an output of the DC-DC converter 3 is connected to an input of the DC-DC converter 4 through a diode D3, and the DC-DC converter outputs the stable DC voltage to supply power to the basic converter module.

12. The modular intelligent combined wind power converter according to claim 9, wherein the control power module comprises that:

a control power supply is provided with three AC input ports and two DC input ports; the AC input ports are used for connecting a three-phase AC voltage, and the DC input ports are used for connecting a DC voltage; the three-phase AC voltage is connected to a DC-DC converter 3 after passing through a uncontrolled rectifier, the DC voltage is connected to a DC-DC converter 2, second outputs of the DC-DC converter 2 and the DC-DC converter 3 are connected to two input ports of a DC-DC converter 5, and output port of the DC-DC converter 5 charges a battery unit through a diode D5; and an output of the battery unit is connected to an input of a DC-DC converter 1 through a diode D4, the DC-DC converter 1 outputs a stable DC voltage Udc1, the DC-DC converter 2 outputs a stable DC voltage Udc2, and the DC-DC converter 3 outputs a stable DC voltage Udc3; an output of the DC-DC converter 1 is connected to an input of the DC-DC converter 4 through a diode D1, an output of the DC-DC converter 2 is connected to an input of a DC-DC converter 4 through a diode D2, an output of the DC-DC converter 3 is connected to an input of the DC-DC converter 4 through a diode D3, and the DC-DC converter outputs the stable DC voltage to supply power to the basic converter module.

13. The modular intelligent combined wind power converter according to claim 1, further comprising: an active circulation control method for achieving thermal balance of a modular intelligent combined wind power converter by adopting multi-mode active circulation control, comprising implementing:

mode 1: a positive-sequence active circulation control mode, wherein multiple switches S1, S2 and S3 are all located at a position 1, in the modular intelligent combined wind power converter, a positive-sequence circulating current with an amplitude $i_{cp}$ flows in a plurality of converters, an additional component $i_{di\_cp}$ is added to a d-axis reference current of each converter, an expression thereof satisfying:

$$\begin{cases} i_{cp} = \sum_{i=1}^{m} k_i \cdot i_{di\_cp} \\ i_{cp} = -\sum_{i=m}^{n} k_i \cdot i_{di\_cp} \\ i_{qi\_cp} = i_{zi\_cp} = 0 \end{cases}$$

mode 2: a negative-sequence active circulation control mode, wherein multiple switches S1, S2 and S3 are all located at the position 1, in the modular intelligent combined wind power converter under the mode 2, a negative-sequence circulating current with an amplitude $i_{cp}$ flows in the plurality of converters, and an additional component $i_{di\_cp}$ is added in the d-axis reference current of each converter, an expression thereof satisfying:

$$\begin{cases} i_{cp} = \sum_{i=1}^{m} k_i \cdot i_{di\_cpm} \\ i_{cp} = -\sum_{i=m}^{n} k_i \cdot i_{di\_cpm} \\ i_{di\_cp} = i_{di\_cpm} \cos(2\omega t + \phi), \, i_{qi\_cp} = i_{zi\_cp} = 0 \end{cases}$$

mode 3: a reactive active circulation control mode, wherein multiple switches S1, S2 and S3 are all located at a position 2, in the modular intelligent combined wind power converter under the mode 3, a reactive circulating current with an amplitude $i_{cp}$ flows in the converters, and an additional component $i_{qi\_cp}$ is added in the d-axis reference current of each converter, an expression thereof satisfying:

$$\begin{cases} i_{cp} = \sum_{i=1}^{m} k_i \cdot i_{qi} \\ i_{cp} = -\sum_{i=m}^{n} k_i \cdot i_{qi} \\ i_{di\_cp} = i_{zi\_cp} = 0 \end{cases}$$

and mode 4: a zero-sequence active circulation control mode, wherein multiple switches S1, S2 and S3 are all located at a position 3, in the modular intelligent combined wind power converter under the mode 4, a zero-sequence circulating current with an amplitude $i_{cp}$ flows in the converters, and an additional component $i_{zi\_cp}$ is added in the d-axis reference current of each converter, an expression thereof satisfying:

$$\begin{cases} i_{cp} = \sum_{i=1}^{m} k_i \cdot i_{zi} \\ i_{cp} = -\sum_{i=m}^{n} k_i \cdot i_{zi} \\ i_{di\_cp} = i_{qi\_cp} = 0 \end{cases}$$

14. The modular intelligent combined wind power converter according to claim 1, further comprising: a grid-connected current harmonic optimization control method for achieving harmonic optimization control of grid-connected current through a control method of variable switching frequency, comprising the following steps:
   increasing a switching frequency at a lower power, and reducing a magnitude of harmonic waves at the low power;
   equally dividing a wind power operation working condition from 0.2 pu-1 pu in accordance with a step length of 0.2 pu;
   when the modular intelligent combined wind power converter operates in a state of 0-0.2 pu, selecting the switching frequency to be 5.1 KHz, wherein the switching frequency is reduced by 0.3 KHz every time the power is increased by 0.2 pu;
   when the modular intelligent combined wind power converter is reduced to 0.78 pu from a rated working condition, increasing the switching frequency by 0.3 KHz to form power-frequency hysteresis of 0.02 pu, and so on as the power is reduced; and
   by measuring the magnitude of the grid-connected current, computing an effective value thereof, and judging a power change direction thereof, reading a switching frequency value stored in a memory in advance through table look-up, and sending the switching frequency value back to a PWM generator to achieve the variable switching frequency control, thus reducing the harmonic waves of the grid-connected current in a low-power state.

15. The modular intelligent combined wind power converter according to claim 1, further comprising: a converter thermal stress balance control method for achieving converter thermal stress balance control by performing change control on a switching frequency in a current cyclic wave, comprising the following steps:
   dividing a grid-connected current into 40 equal parts in one cycle according to a phase;
   a highest switching frequency at 0-0.05 pi being 2100 Hz, reducing the switching frequency by 90 Hz every 0.05 pi until reaching a current peak value at 0.5 pi, then gradually increasing the switching frequency;

making a current phase correspond to the switching frequency, and storing the current phase in a memory in advance; and detecting a three-phase current of a power grid, and detecting a phase angle of the three-phase current; substituting the detected phase angle into a table stored in advance to obtain a corresponding switching frequency, and transmitting the corresponding switching frequency to a PWM generator.

16. The modular intelligent combined wind power converter according to claim 1, further comprising: a parallel current-sharing control method for achieving a parallel control of a modular combined voltage source type wind power converter by adopting a current-sharing control method, comprising the following steps:

computing reactive power of a grid-connected side according to a three-phase grid-connected voltage and a current of a grid-side converter module 1;

obtaining $\Delta u_{t1}$ from a difference value between a given reactive power and an actual reactive power by a PI regulator;

obtaining a reference value of an angle from a DC voltage by a proportional integrator;

performing Park transformation on a three-phase current to obtain $i_{d1}$ and $i_{q1}$, thereby further obtaining an average current of n grid-side converters as:

$$\begin{cases} i_{davg} = \sum_{i=1}^{n} i_{di} \\ i_{qavg} = \sum_{i=1}^{n} i_{qi} \end{cases}$$

obtaining $\Delta\theta$ from a difference value between an average current $i_{davg}$ and a sum of $i_{d1}$ by the PI regulator;

obtaining $\Delta u_t$ from a difference value between an average current $i_{qavg}$ and a sum of $i_{q1}$ by the PI regulator, and then respectively obtaining a phase and an amplitude of a modulation wave as follows:

$$\begin{cases} \theta = \frac{\omega_0}{s} u_{dc} + \left(K_{ip} + \frac{K_{ii}}{s}\right)\left(\sum_{i=1}^{n} i_{di} - i_{d1}\right) \\ u_t = u_{t0} + \left(K_{Qp} + \frac{K_{Qi}}{s}\right)(Q_{gref} - Q_g) + \left(K_{ip} + \frac{K_{ii}}{s}\right)\left(\sum_{i=1}^{n} i_{dq} - i_{dq}\right) \end{cases}$$

and obtaining a three-phase modulation wave according to a phase angle and a magnitude of the modulation wave, and driving the grid-side converters through PWM modulation.

17. The modular intelligent combined wind power converter according to claim 1, further comprising: a converter stable control method for adjusting equivalent impedance of a grid-connected side converter of a modular intelligent combined wind power converter in different frequency bands or a phase angle margin at a corresponding frequency band by arranging different impedance reshaping loops in different links of a current loop, and improving a grid-connected stability of the modular intelligent combined wind power converter, comprising the following steps:

feeding back a current error to an output of the current loop through a control link Dc(s) to form an impedance reshaping loop 1;

adding a grid-connected point voltage to a given reference value of the current loop through IPLL(s) to form an impedance reshaping loop 2;

and adding the grid-connected point voltage to a control output of the current loop through Df(s) and multiplied by a gain Kf to form an impedance reshaping loop 3.

18. The modular intelligent combined wind power converter according to claim 1, further comprising: a power grid impedance self-adaptive control method for achieving a current loop self-adaptive control of a grid-connected side converter of a modular intelligent combined wind power converter through on-line detection of the power grid impedance, comprising the following steps:

determining initial control parameters of a current loop control unit, a resonance damping control unit, an impedance reshaping control unit and a phase-locked loop control unit according to basic parameters of a system;

achieving measurement of grid-connected point impedance parameters and a system resonant frequency point by injecting a small-amplitude characteristic frequency voltage disturbance signal into a grid-connected point;

designing a resonance damping controller of the grid-connected converter by connecting a multi-frequency wave trap in series with an adjustable gain link, thus achieving broadband resonance active damping control of the grid-connected converter;

designing a current controller of the grid-connected converter by adopting a proportional multi-quasi-resonance control method and an internal model control method, thus achieving suppression control of the grid-connected converter on a harmonic resonance current;

computing stability margins of the system at different frequency points under the current control parameters, and determining a frequency band range with smaller stability margins;

performing impedance reshaping on the frequency points with insufficient stability margins of the grid-connected converter by adopting a method of adding a frequency selection network link to a voltage feedforward loop and designing a current loop tracking an error control loop;

through a controller parameter automatic tuning unit, computing the control loop parameters of the grid-connected converter in real time according to demands of a system full-band stability margin by taking the obtained grid-connected point impedance parameters and a system resonant frequency as basic parameters; and inputting the calculated control parameters to the current loop control unit, the resonance damping control unit, the impedance reshaping control unit and the phase-locked loop control unit to update the control parameters of the system.

* * * * *